United States Patent [19]
Makino et al.

[11] Patent Number: 5,531,301
[45] Date of Patent: Jul. 2, 1996

[54] HIGH SPEED LOW NOISE CURRENT COLLECTING EQUIPMENT AND METHOD ON COLLECTING CURRENT

[75] Inventors: Toshiaki Makino; Katsuyuki Terada; Michio Sebata; Morishige Hattori, all of Kudamatsu; Hideo Takai, Hikari; Toshi Yasui, Kudamatsu; Masabumi Oshima, Hitachi; Akiyoshi Iida, Mitsukaido; Yasushi Takano, Chiyoda-machi; Chisachi Katoo, Ami-machi; Kenji Kobayashi, Chiyoda-machi, all of Japan

[73] Assignee: Hitachi, Ltd., Tokyo, Japan

[21] Appl. No.: 174,280

[22] Filed: Dec. 28, 1993

[30]  Foreign Application Priority Data

Dec. 28, 1992 [JP] Japan ................................ 4-347955
Feb. 16, 1993 [JP] Japan ................................ 5-026500
Apr. 26, 1993 [JP] Japan ................................ 5-099822

[51] Int. Cl.⁶ ........................... B60L 5/08; B60L 5/16; B60L 5/28
[52] U.S. Cl. .................. 191/55; 191/59.1; 191/66
[58] Field of Search .................. 191/50, 54, 55, 191/56, 57, 58, 59.1, 64, 65, 66, 67, 68

[56] References Cited

U.S. PATENT DOCUMENTS

| | | | |
|---|---|---|---|
| 2,824,911 | 2/1958 | Taylor | 191/59.1 X |
| 3,405,240 | 10/1968 | Kilburg | 191/59.1 |
| 4,116,312 | 9/1978 | Adler et al. | 191/64 |
| 4,510,352 | 4/1985 | May et al. | |
| 4,742,185 | 5/1988 | Pelletier et al. | 191/59.1 |

FOREIGN PATENT DOCUMENTS

| | | | |
|---|---|---|---|
| 1903746 | 8/1970 | Denmark . | |
| 0222128 | 9/1986 | European Pat. Off. . | |
| 2830027 | 1/1979 | Germany | 191/59.1 |
| 2753932 | 5/1979 | Germany | 191/59.1 |
| 1273101 | 12/1986 | Japan | 191/59.1 |
| 5-49104 | 2/1993 | Japan . | |
| 5-49103 | 2/1993 | Japan | 191/55 |
| 5-68304 | 3/1993 | Japan | 191/55 |
| 5146004 | 6/1993 | Japan | 191/65 |
| 5176403 | 7/1993 | Japan | 191/55 |
| 6-22404 | 1/1994 | Japan | 191/65 |
| 6-22406 | 1/1994 | Japan | 191/65 |
| 1271771 | 11/1986 | U.S.S.R. | 191/59.1 |

OTHER PUBLICATIONS

Nikkei mechanical; "Speeding up Shinkansen"; May 4, 1992, pp. 22 to 40.

Primary Examiner—Karen B. Merritt
Assistant Examiner—Scott L. Lowe
Attorney, Agent, or Firm—Antonelli, Terry, Stout & Kraus

[57] ABSTRACT

The invention relates to a current collector for an electrically powered vehicle. The collector includes a current collecting member which collects current from a current supplying body and conducts the current to a load in the vehicle. The current collecting member is coupled to a driving system through a first insulating element. The driving system moves the current collecting member to the current supplying body. A sensor for controlling the driving system is positioned between the driving system and the insulating element.

31 Claims, 31 Drawing Sheets

$d_1 > D_1$ $w_1 > D_1$

HIGH SPEED LOW NOISE CURRENT COLLECTING EQUIPMENT AND METHOD ON COLLECTING CURRENT

BACKGROUND OF THE INVENTION

The present invention relates to current collecting equipment and a method of current collecting for a railway vehicle, such as a high speed railway vehicle.

Aerodynamic noise which is produced by a high speed railway vehicle rapidly increases with increasing speed of the vehicle proportional to approximately the eighth power of its velocity. On the other hand, the concern about preservation of the environment has been growing and will be an important factor in the future. Therefore, it is required for a vehicle running at a high speed (for example, over 270 km/hr) to carry low noise current collecting equipment.

A low noise current collecting equipment is proposed in an article entitled "Speeding up SHINKANSEN" (Nikkei mechanical, published on May 4, 1992, pages 22 to 40). The following is described in this report (especially on page 27).

It is desirable for lowering noise that a member having a contact strip as a current collecting member has a streamlined shape. Taking the combination of the streamline-shaped member and strut supporting the member into consideration, a lifting force takes place. The lift causes the contact strip to become detached from the trolley wire or contacts to the trolley wire with exceeding force to cut the trolley wire. With the provision of two kinds of current collecting equipment depending on the direction of running of the vehicle, switching from the one kind to the other kind is performed at a turn back station. The current collecting equipment is T-shaped and is formed with large sized members in order to decrease any produced frequency vibration.

Further, taking these facts described above into consideration, a view of a T-shaped current collecting equipment is illustrated in FIG. 5 in the paper. This current collecting equipment comprises a member supporting a contact strip with a fine motion spring, a cylinder for raising and lowering the member through a restoring spring, and an insulator supporting the cylinder.

On the other hand, the conventional pantograph type current collecting equipment comprises a pantograph having a contact strip, a pneumatic cylinder for raising and lowering the pantograph, four insulators to support and insulate a support base mounting the pantograph and the pneumatic cylinder, and a conducting cable installed on the roof of the vehicle. The compressed air supply to the pneumatic cylinder is performed with an installed pipe penetrating through the insulator.

Further, other constructions of current collecting equipment for high speed railway vehicles in order to lower noise are also described in Japanese Patent Application Laid-Open No. 5-49103(1993) and Japanese Patent Application Laid-Open No. 5-49104(1993).

The current collecting equipment for high speed railway vehicles, the T-shaped current collecting equipment proposed in the above paper and the current collecting equipment for high speed railway vehicles proposed in the above Japanese Laid-Open Patent Application Applications, are designed to resolve the problems which accompany high speed running. However, since the functions of the pantograph, (1) the function of contacting and following a trolley wire and (2) the function of conducting current to direct collected electric power to the vehicle, are attempted to be provided with only one construction, as in the conventional pantograph, it is difficult to satisfy the seemingly conflicting requirements concerning responsive following of the trolley wire and lowering of noise caused by increasing the vehicle speed.

For example, the conventional T-shaped current collecting equipment has the following disadvantages. First, the cylinder for raising and lowering the contact is positioned on the contact strip side near to the supporting insulator. Therefore, said cylinder for raising and lowering has to be provided as a pneumatic cylinder. Although it is desirable for a high speed vehicle, from the point of view of responsive control, to employ an oil-hydraulic cylinder, the oil-hydraulic cylinder cannot be employed in the equipment.

Further, the raising and lowering cylinder has a control system to maintain the contact pressure against the trolley wire constant and requires means for detecting the contact pressure, such as a load cell, to be used as a control input. The position to set the contact pressure detecting means is on the contact strip side near the raising and lowering cylinder. Since the position is in a portion of the high voltage region, the countermeasure for insulation of the detecting means is required.

Furthermore, although the current collecting equipment is designed for collecting current, the above-mentioned paper does not disclose its current conducting system at all.

With regard to the cylinder that is used to raise or lower the current collecting equipment when it is switched at a turn back station, since the current collecting equipment not being used forms a projection, there is a limit to the lowering of noise produced by the equipment.

It is thought that the current collecting equipment described in the above-mentioned Japanese Laid-Open Patent Applications also have the same problem.

SUMMARY OF THE INVENTION

An object of the present invention is to provide current collecting equipment and a method for current collecting suitable for a high speed railway vehicle which is excellent in its controllability and in responsiveness for trolley wire following.

Another object of the present invention is to provide current collecting equipment and a method for current collecting suitable for a high speed railway vehicle which is low in producing noise.

A further object of the present invention is to provide current collecting equipment and a method for current collecting which is capable of preventing production of noise caused by the current collecting equipment not being used.

A still further object of the present invention is to provide a vehicle having current collecting equipment which is always capable of correctly controlling the contact pressure against the trolley wire during high speed running.

The objects of the present invention can be attained by separating the functions of a pantograph into a function of following the trolley wire and a current conducting function for collected electric power in order to make the current collecting equipment carry out each of the functions. In other words, the object of the present invention can be attained by providing current collecting equipment which comprises a current collecting member, a driving system to move said current collecting member, an insulating element to connect said current collecting member and said driving system, a conductive element juxtaposed with said driving system and having its outer surface covered with an insulator to receive the current collected with said current collecting member and to direct the current to the load side.

The objects of the present invention can also be attained by providing current collecting equipment which comprises a current collecting member, a driving system to move said current collecting member, a conductive element to direct the current collected with said current collecting member, a support base mounting said driving system and said conductive element, rotating means for rotating said support base around a horizontal axis, a containing part mounted on the roof of the vehicle to contain said rotating means and containing said driving system and said current collecting system.

According to the present invention, a part of the structure having a current collecting function can be light in weight and small in size and can improve the control characteristic for the following of the trolley wire, since the part of the structure having the current collecting function, which comprises the current collecting member and the driving system, is installed separately from a part of the structure having the power current conducting function, which can, further, maintain the power current collecting function sufficiently.

Furthermore, the generation of noise during vehicle running can be suppressed since there is provided a containing system on the roof of the vehicle inside of which the driving system is always contained and the part of the structure having the current collecting function together with the part of the structure having the power current conducting function is contained when it is not used.

DETAILED DESCRIPTION OF THE PREFERRED EMBODIMENTS

A first embodiment according to the present invention will be described in detail, referring to FIG. 1 through FIG. 32.

Figure 1:
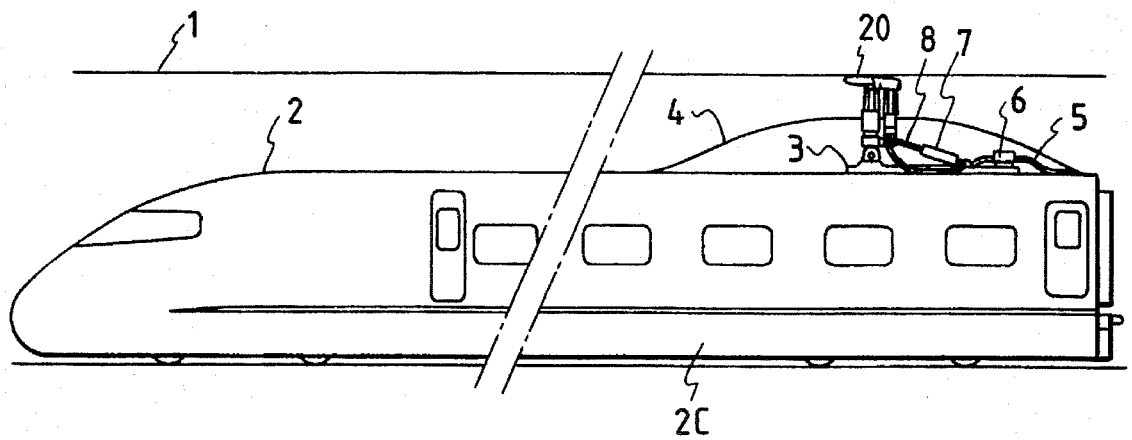
FIG. 1 is a side view showing the external appearance of a high speed vehicle to which the present invention is applied.

FIG. 1 shows an external appearance of a high speed vehicle to which the present invention is applied. In order to lower noise, the external surface of a vehicle body 2 is formed smooth, and bogies are also covered with covers 2C. The bottom half of a current collector 20 is positioned so as to be surrounded by a containing dome 4. The main parts of current collecting system, such as a supporting insulator for insulation, a cable head for current conduction, a collector head and so on, are projected from the center of the containing dome 4 and into contact with a trolley wire, when current is to be collected. The external surface of the containing dome 4 is streamline-shaped to lower aerodynamic resistance. Inside of the containing dome, there are a base plate 3, a high voltage cable 5, a high voltage connector 6, and a cylinder 7 coupled to a connecting rod 8 to raise and lower the current collector 20.

For such a vehicle, the voltage in the trolley wire is generally used alternating current of 25 kV, the current is 200 A, and the cycle is 50–60 Hz. In order to maintain a sufficient insulation distance and a creeping distance for such a high voltage, it is necessary to use a very tall current collector 20 and an insulator having a lot of folds. Such an insulator produces a running aerodynamic resistance and becomes a large noise source when the vehicle is running at a high speed. Therefore, the current collector 20 according to the present invention is contained in the inside of the dome 4 when the apparatus is not in a current collecting condition.

Figure 2:
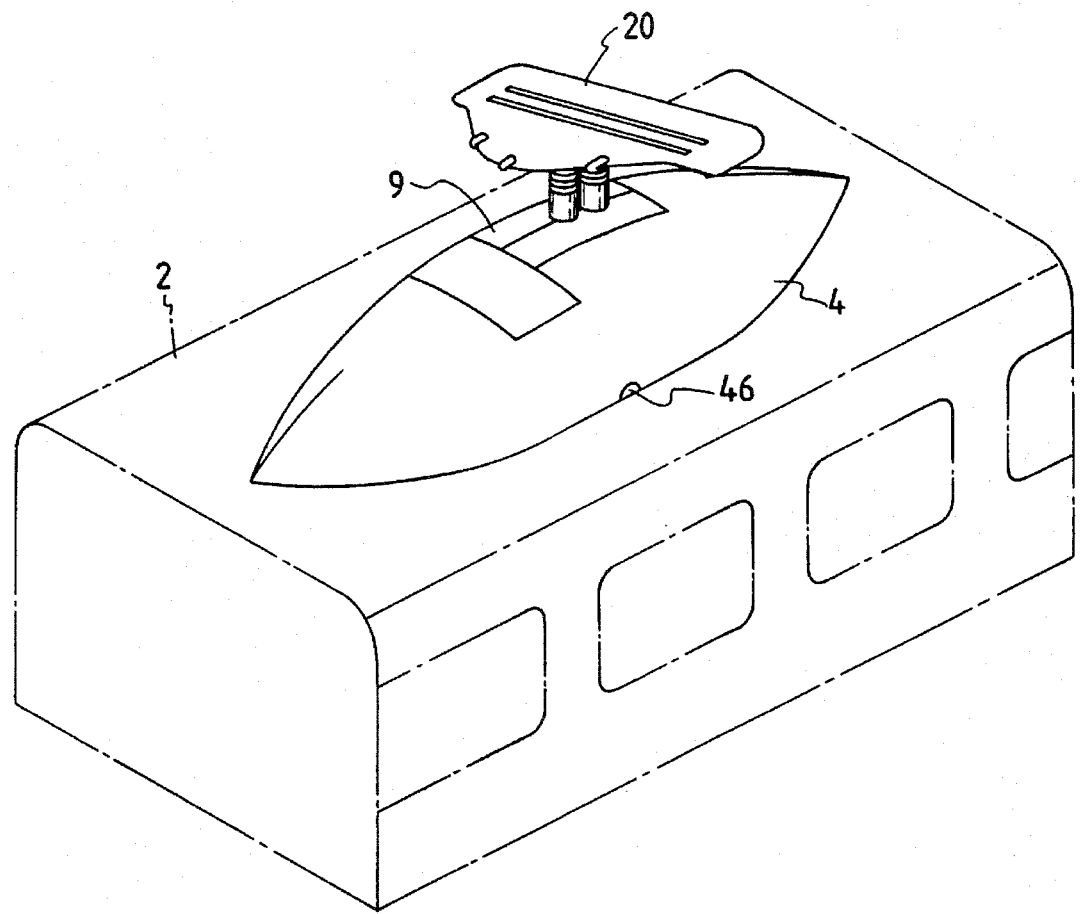
FIG. 2 is perspective view of the vehicle in FIG. 1 when the current collecting equipment is in a current collecting condition.
Figure 3:
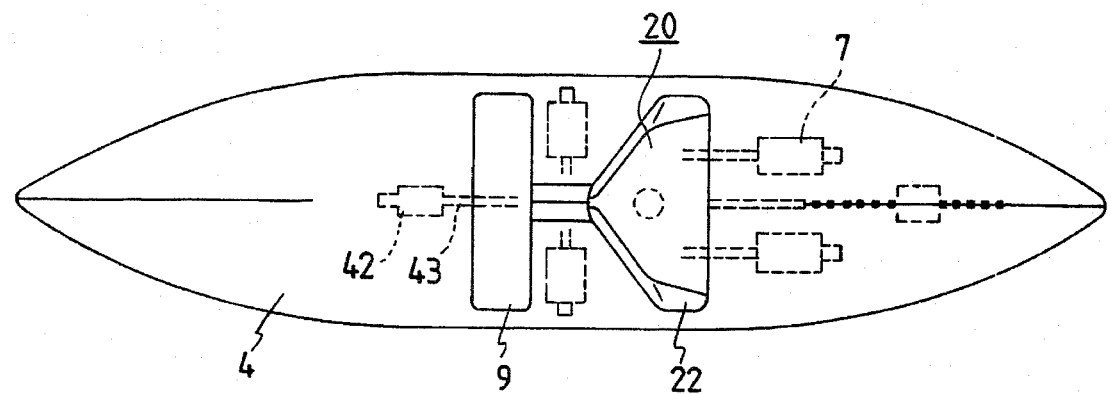
FIG. 3 is a plan view of current collecting equipment and a containing dome forming an embodiment according to the present invention.
Figure 4:
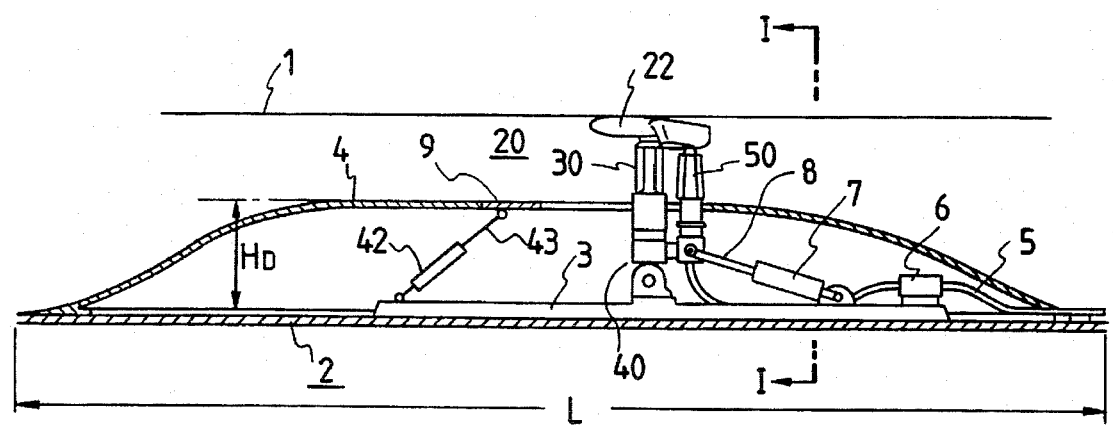
FIG. 4 is a vertical sectional view of current collecting equipment and a containing dome according to the present invention.

FIG. 2 shows a condition where the current collector 20 is in the current collecting condition and extends up near the center of the containing dome 4. The gap between the current collector 20 in the current collecting condition and the containing dome 4, which forms the opening for the current collector, is entirely closed with a shutter system 9.

FIG. 3 through FIG. 7 show detailed views of the current collector 20 and the containing dome 4 in accordance with the present invention.

Since the current collector 20 is not operated with a folding structure, as provided in the conventional pantograph, the current collector 20, as one unit of a collector head 22, a support insulator 30, a driving rod 31 for upward and downward driving, a cylinder 32, a cable head for current conduction 50, is rotated with a rotating system 40 around a horizontal axis so as to be lowered into the containing dome 4 when it is not in the current collecting condition. Therewith, the aero-dynamic resistance and the noise during vehicle running can be decreased.

Raising and lowering of the current collector 20 is performed with a cylinder 7 and a rod 8 to rotate the current collector 20 around an axis 40A of the rotating system 40. Incidentally, the rotating system 40 is supported with a fixed member 41 which is mounted on the base plate 3 on a car body 2.

When the current collector 20 is raised or lowered, the shutter system 9 is opened with operation of a cylinder 42 and a rod 43. When the current collector 20 is collecting current or is contained in the containing dome 4, the shutter system 9 is closed. These operations are carried out by the control of a sequencer or a computer installed separately. The details of this will be described later.

A high voltage flexible cable 44 is subject to heavy fatigue and is required to be changed on schedule since it is moved every time the current collector 20 is raised and lowered. Therefore, a high voltage connector 6 is provided between the flexible cable 44 and the high voltage cable 5 buried in the car body 2 so as to make changing of the high voltage flexible cable 44 easy.

Figure 5:
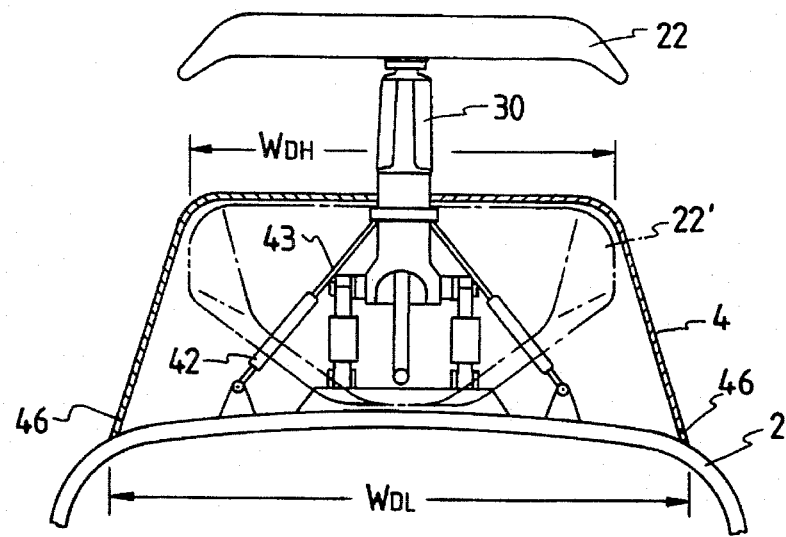
FIG. 5 is a transverse view taken on the plane of the line I—I in FIG. 4.

Any water which enters into the containing dome 4 from the gaps between shutters 110, 120, 130, 140 or the gaps between the insulator 30, or the insulating member 50 and the shutter 130, flows out to the roof of the vehicle through drain holes 46 provided on both side walls in the bottom of the containing dome 4. As the roof of the vehicle body 2 is, as shown in FIG. 5, arc-shaped in a convex upward orientation, draining is easily carried out through the drain holes 46 on both side walls of the containing dome 4.

As shown in FIG. 6 through FIG. 9, contact strips 21 for current collecting are buried on the top of the collector head 22 having a delta-wing shape, and are pushed against the trolley wire 1 by contact strip pressing springs 23 and with a driving system which will be described later. The collector head 22 is secured to the top of the supporting insulator 30 with bolts, and the supporting insulator 30 is secured to a driving rod 31 positioned below and projecting from a driving cylinder 32. The numeral 33 designates a load cell to detect the force acting between the driving rod 31 and the supporting insulator 30, that is the reaction force to push up the collector head 22. The driving rod 31 is pushed up by means of hydraulic pressure produced with a hydraulic pressurizer separately installed in such a way that the contact pressure of the current contact strips 21 against the trolley wire 1 is controlled to become optimum.

Figure 8:
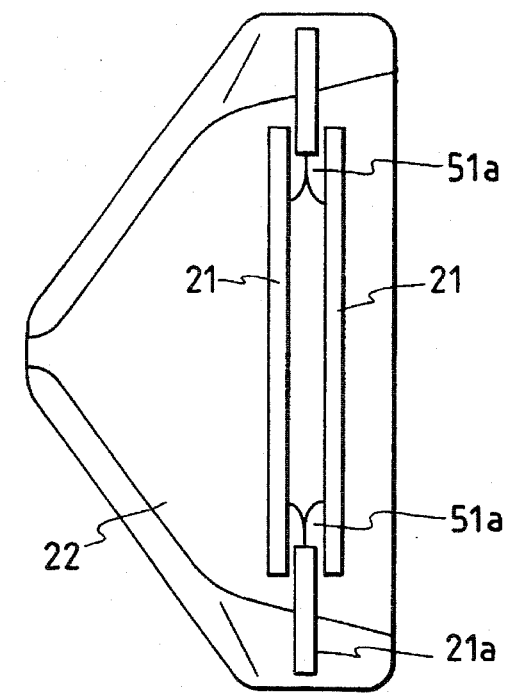
FIG. 8 is a plan view of the current collecting equipment in FIG. 6.
Figure 9:
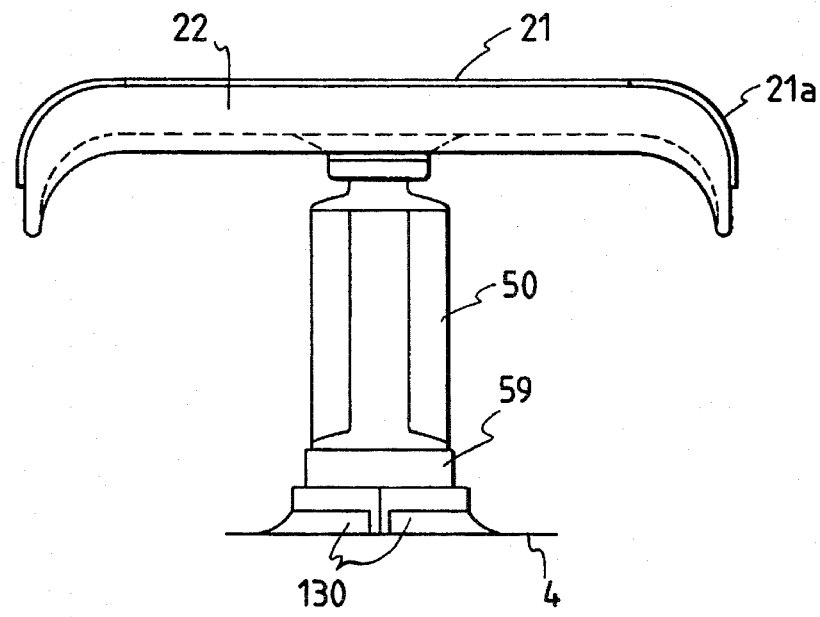
FIG. 9 is a front view of the current collecting equipment in FIG. 6.

The collector head 22 has a nearly triangular wing shape when it is seen from above, as shown in FIG. 8. The ends in the width-direction of the collector head 22 are bent in a downward direction. There are contact strips 21a secured on the top surface of the wing in those portions. These contact strips are made of a harder material than the material of the wing (such as, for example, steel, copper, brass). These members are dummy strips to prevent the collector head 22 from abrasion when the trolley wire comes to the wing end portion and the collector head 22 itself contacts the trolley wire 1. The contact strips 21a are secured to the collector head 22 with bolts such that the strips have the same potential as the collector head to prevent sparking. The bolts are positioned in the hollow parts in the contact strips to decrease projecting parts on the surface. There is no spring 23 between the contact strips 21a and the collector head 22.

The contact strips 21 and 21a are electrically connected to a conducting wire 51a. When the collector head 22 is made of a non-conductive material, such as FRP, a conductive member is provided between the contact strips 21 and 21a and the conductive wire 51a.

The external surface of the connecting part of the supporting insulator 30 and the collector head 22 is arc-shaped. Thereby, the production of aerodynamic noise generated in said portion is decreased.

Figure 6:
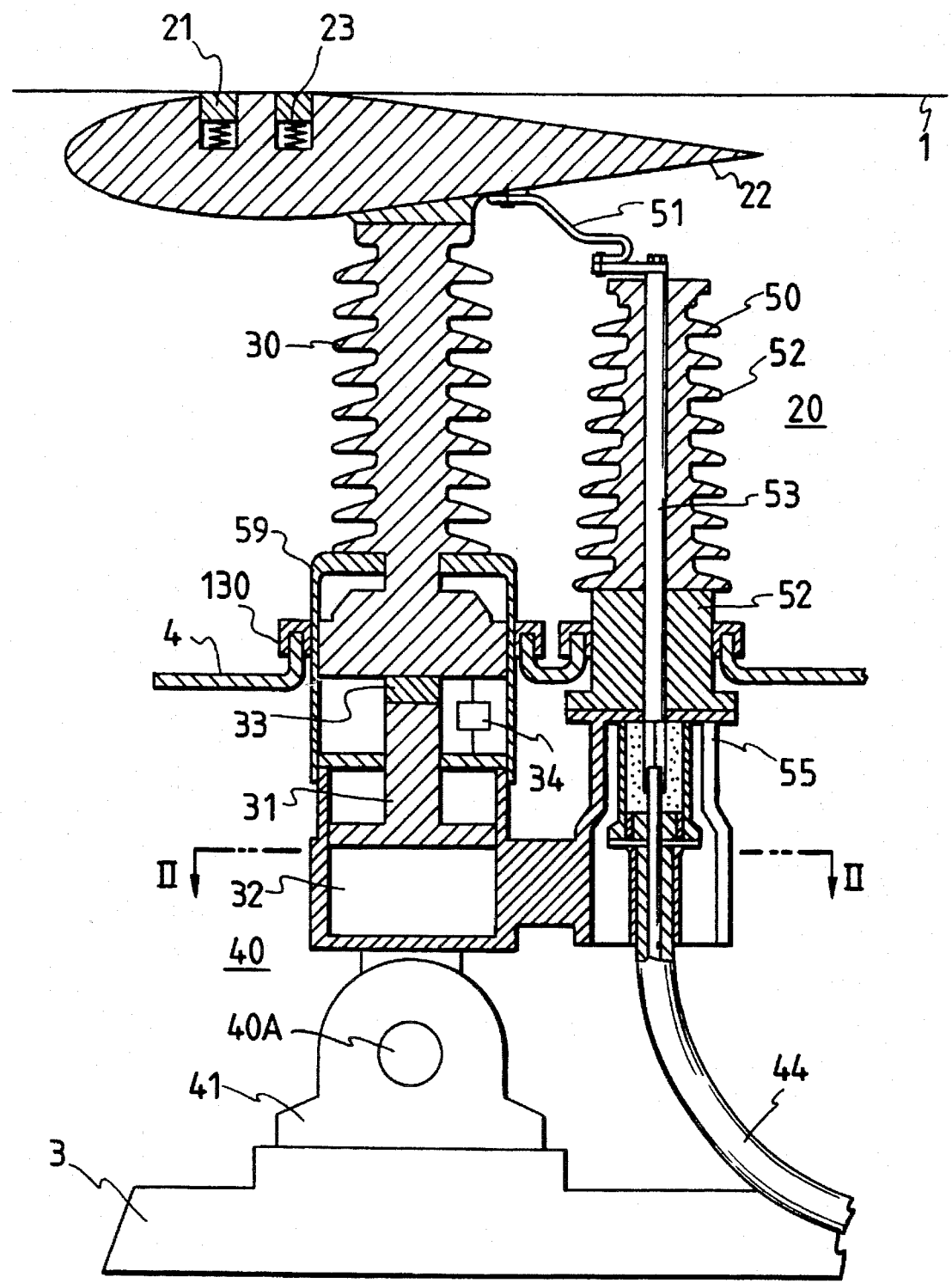
FIG. 6 is a vertical sectional view of the main part of the current collecting equipment in FIG. 3.
Figure 7:
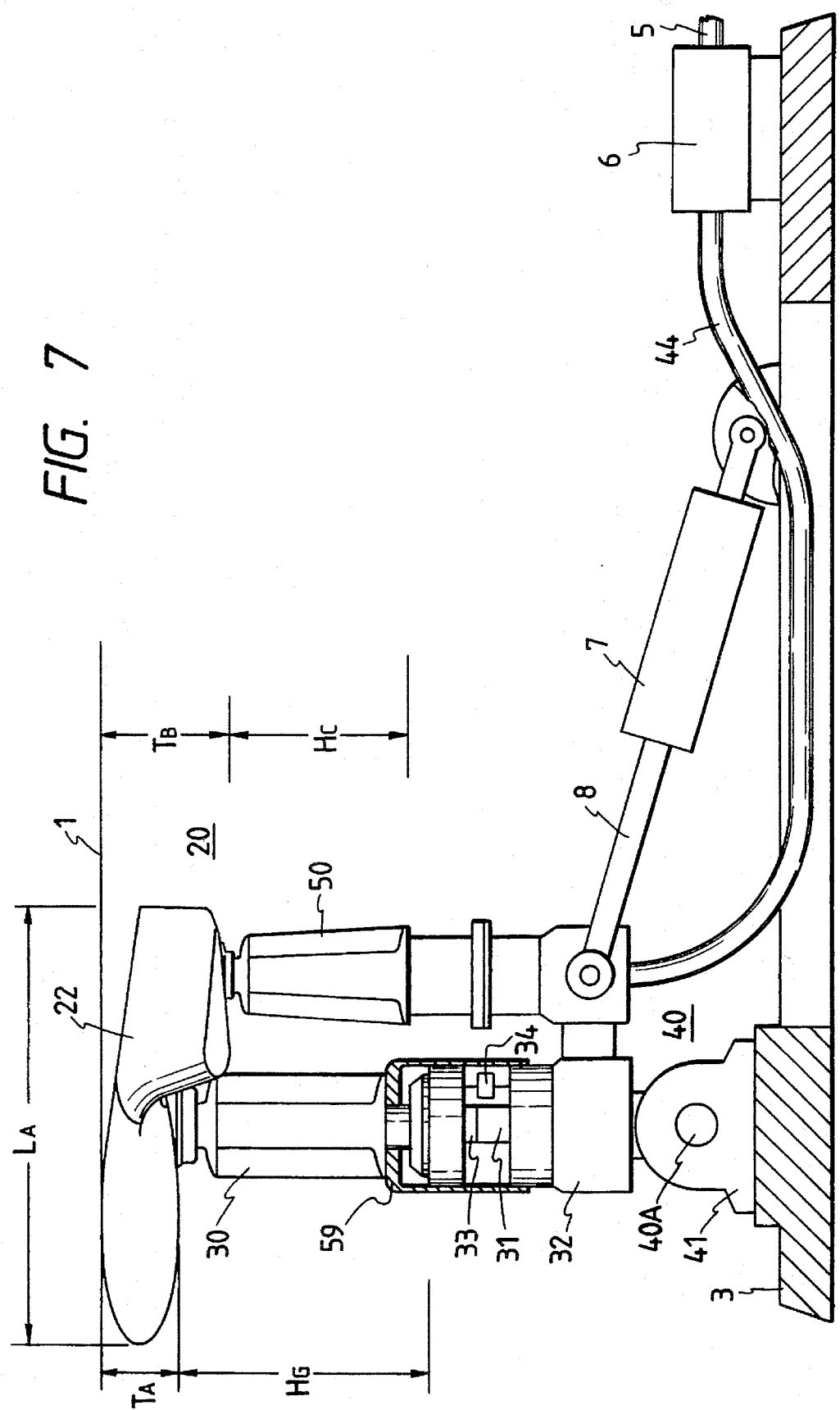
FIG. 7 is a side view showing the driving system of the current collecting equipment in FIG. 3.

The longitudinal cross section of the collector head 22 is stream-line shaped the height of which is progressively reduced in the rear-ward direction, as shown in FIG. 6. The material of the collector head 22 is aluminum in order to decrease its weight. It may be formed mainly with resin, the surface of which is coated with GFRP or CFRP.

The driving rod 31 for the driving cylinder 32 and the bottom portion of the supporting insulator 30 are connected through a unit of the load cell 33 by way of the top and bottom flanges thereof. The bottom portion of the supporting insulator 30 is cylindrical, and the diameter of the supporting insulator 30 is the same as the diameter of the cylinder portion of the cylinder 32. This portion is covered with a sleeve 59. The sleeve 59 is longitudinally cut into halves which are fixed to the cylindrical portion of the supporting insulator 30 and the cylinder portion of the cylinder 32 from outer-ward of the radial direction using flat countersunk head screws. The length of the sleeve 59 is longer than the stroke of the driving rod 31. The corner of the top end of the sleeve 59 is rounded. The driving rod 31 is a rod driven with oil-hydraulic pressure. The numeral 130 indicates a shutter to cover the surrounding area of the sleeve 59, which will be described later.

The cable head for current conduction 50 described above has a structure in which the conductive element 53 penetrates the center of the insulator 52 in the axial direction. The top of the conductive element 53 projects from the insulating portion, and has a brace projecting sideways which is fixed with bolts. Instead of this, a protective cap may be attached to the portion, as well known. A high voltage flexible cable 44 is attached to the bottom end of the conductive element 53. The outer diameter of the cable head 50 gradually decreases toward its top, and the cable head 50 serves as a high voltage insulator.

The brace on the top of the conductive element 53 and the collector head 22 are connected with a conductive wire 51 which is flexibly braided. The conductive wire 51 is fixed with bolts and nuts and is formed of a braided wire, so that the collector head 22 may easily move upward and downward relative to the cable head 50, and has at least one U-shaped turn in a part thereof. The U-shaped turn in the conductive wire 51 makes upward and downward movement easy even when the distance between the fixed ends of the conductive wire 51 is small. The cable head 50 is positioned at the back of the supporting insulator 30, and the connecting positions of the conductive wire 51 with the collector head 22 and the conductive element 53 are also positioned at the back of the supporting insulator 30.

Figure 10:
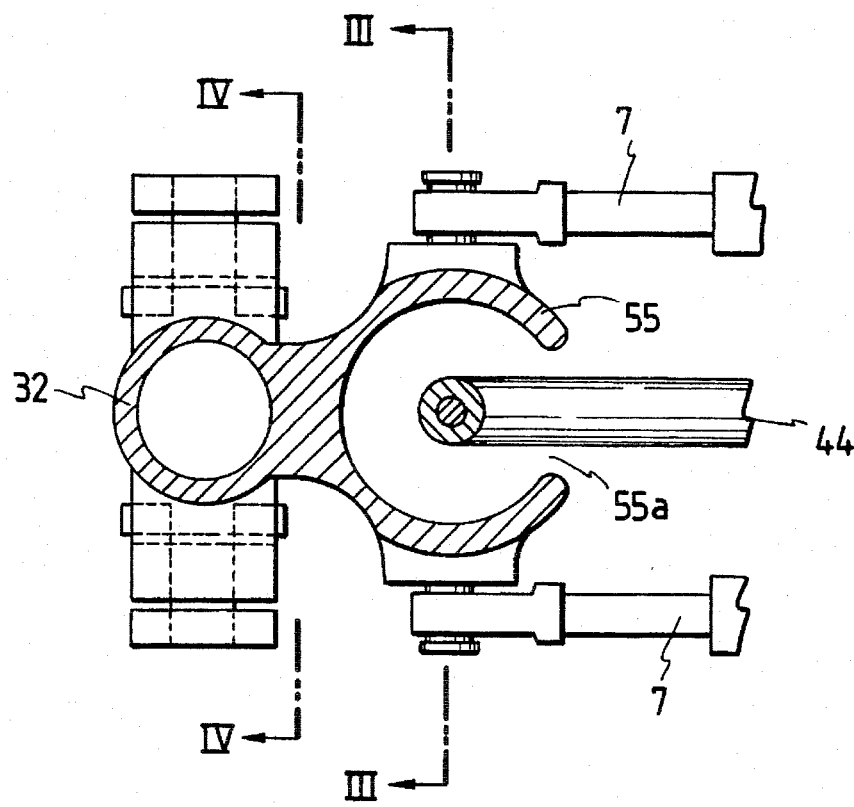
FIG. 10 is a sectional view of the current collecting equipment taken on the plane of the line II—II in FIG. 6.
Figure 11:
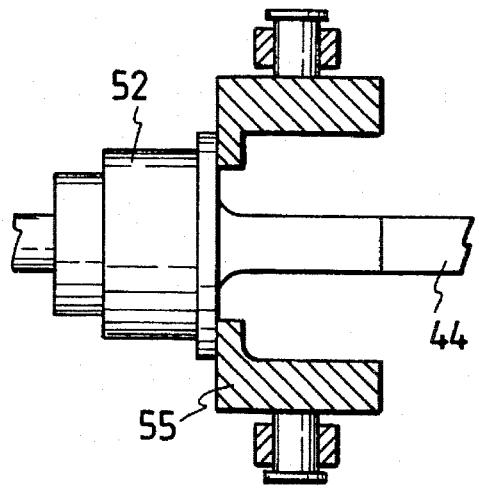
FIG. 11 is a sectional view of the current collecting equipment taken on the plane of the line III—III in FIG. 10.
Figure 12:
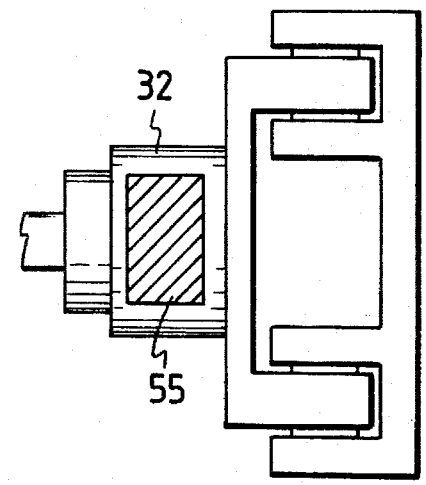
FIG. 12 is a sectional view of the current collecting equipment taken on the plane of the line IV—IV in FIG. 10.

The insulator in the cable head 50 has, as shown in FIG. 6, an uneven portion in its surface, and its bottom portion 52 is columnar. The bottom of the column 52 is fixed to a base 55 from an upper side with bolts. The base 55 and the cylindrical portion of the cylinder 32 are formed as a single unit structure. As seen in FIG. 10 through FIG. 12, there is an opening (55a) in the side surface of the base 55 (the back side in the direction of running) so that the connection portion of the high voltage flexible cable 44 can be inserted from a side direction into the bottom portion of the insulator 52. There are flanges in the bottom of the cable head 50 and in the top of the base 55 which are connected together with a plurality of bolts.

There are connecting portions for the cylinders 7 for raising and lowering the collector head in both sides of the base 55 on either side of the hollow space in the connecting portion of the cable head 50 through which the high voltage flexible cable 44 is penetrated. The extending direction of the cylinder 7 is in the longitudinal direction of the vehicle. The high voltage flexible cable 44 is positioned between the two cylinders 7, as seen in FIG. 10. The high voltage flexible cable 44 is connected to the cable 5 through the connector 6. The high voltage flexible cable 44 is softer than the cable 5. The connector 6 has such a structure that connecting and disconnecting of the connector 6 and the high voltage flexible cable 44 is comparatively easily carried out.

Now returning to FIG. 6 and FIG. 7, the parts, such as the driving cylinder 32, the connector 6, the cylinder 7 and so on, are mounted on the base plate 3 through the fixed member 41. The base plate 3 is fixed to a base secured to the roof of the vehicle itself with bolts. There is a cut part in the base plate 3 below the high voltage flexible cable 44 to make room for bending of the high voltage flexible cable 44 and to make bending of the high voltage flexible cable during rotation of the supporting insulator 30 easy.

By employing this structure, the operation of the driving rod 31 does not affect the high voltage flexible cable 44. The driving rod 31 has a function to push the current collecting contact strip 21 against the trolley wire 1 with a desired pressure as it moves up and down with considerably high frequency. Although the high voltage flexible cable 44 is bent with the operation of the cylinder 7 for raising and lowering the collector head, the bending condition occurs substantially only at the turn back operation and the frequency of bending is extremely small. Therefore, a long wearing life of the cable can be achieved. The load cell 33 can detect the contact pressure with the trolley wire 1.

Since the supporting insulator 30 is disposed between the driving rod 31 and the collector head 22, the driving rod 31 is not subjected to a high voltage. Therefore, an oil-hydraulic type driving cylinder 32 can be employed, which improves the responsiveness to the control signal.

Similarly, since the load cell 33 (pressure sensor) is also installed in a position where a high voltage is not applied, an accurate control input can be obtained.

Since the sleeve 59 is positioned at the bottom end of the supporting insulator 30 and the gap between the supporting insulator 30 and the containing dome 4 can be made small, the inflow of rain, snow or air into the sleeve 59 can be prevented even though the diameter of the rod 31 at the bottom end of the support insulator is small. Therefore, the length below the bottom end fold of the supporting insulator 30 can be made small.

Incidentally, the sleeve 59 may be eliminated when the length of the column at the bottom end of the supporting insulator 30 is longer than the stroke of the driving rod 31.

Figure 13:
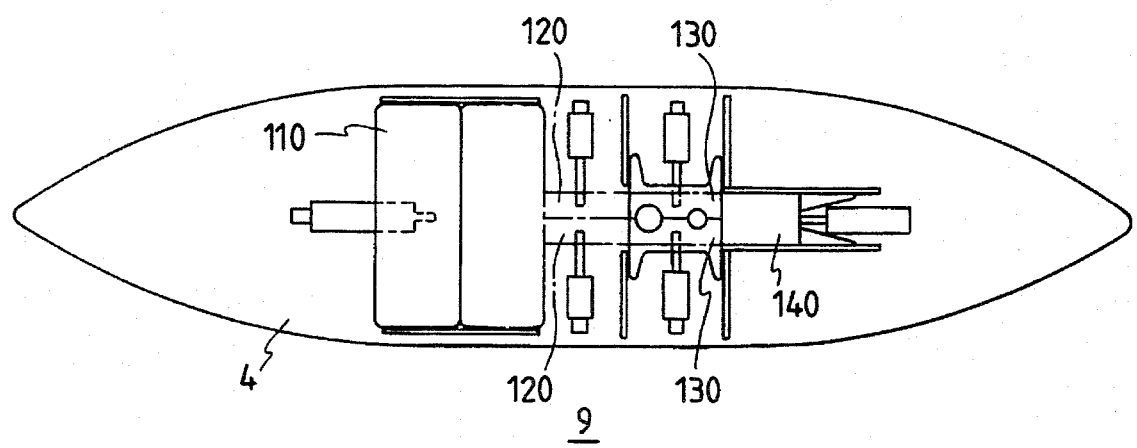
FIG. 13 is a plan view showing the operation of a shutter system in a containing dome.
Figure 14:
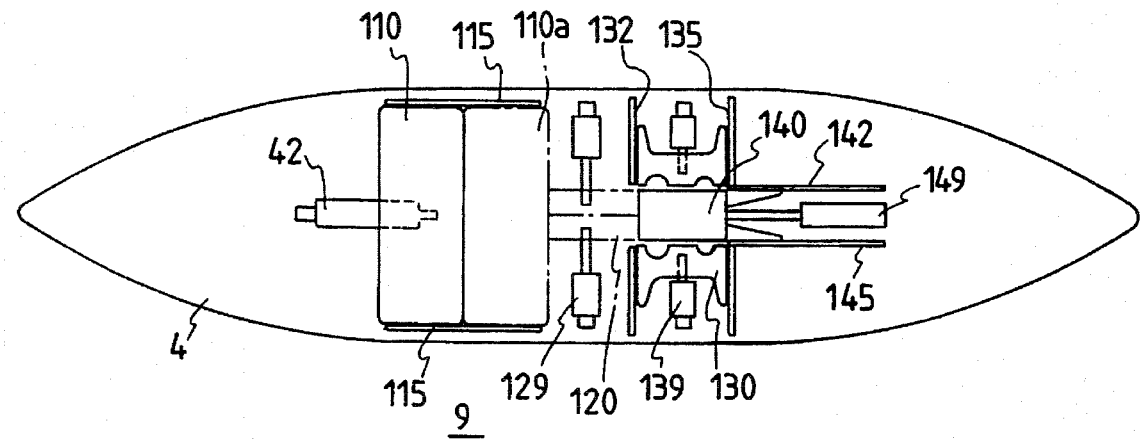
FIG. 14 is a plan view showing the operation of a shutter system in a containing dome.

As shown in FIG. 13 and FIG. 14, there are shutters 110, 120, 130 and 140 in the portion where the current collector 20 penetrates the dome 4, and the shutters usually close the opening. The shutter 110 is a shutter to close the opening through which the collector head 22 penetrates, and is formed of a piece of flat plate. The shutters 120, 120 are shutters to cover the opening through which the supporting insulator 30 penetrates, and are divided in the width-direction of the vehicle into two portions to close one opening with a pair of flap type shutters. The shutters 130, 130 are sliding type shutters to cover the opening where the insulators 30 and 52 pass in the condition of raising upright, and are divided in the width-direction of the vehicle into two portions to close one opening with a pair of shutters. When the shutters 130, 130 close the opening, two circle holes are opened to be penetrated with the sleeve 59 and the insulators 30 and 52. The shutter 140 is a piece of sliding type shutter to close the same opening that the shutters 140, 140 close when the current collector 20 is contained in the containing dome 4. At this time, the shutters 130, 130 do not close the opening.

Figure 15:
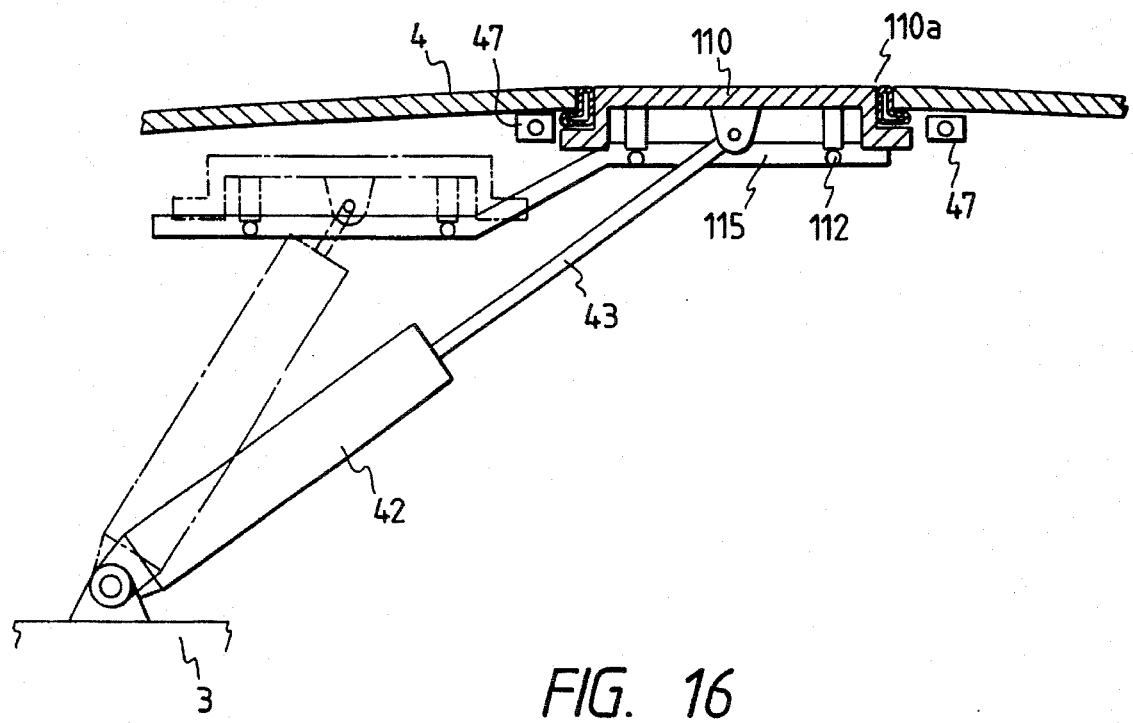
FIG. 15 is a vertical sectional view showing the main part of a shutter system.

Referring to FIG. 14 though FIG. 16, the structure of the driving mechanism of the shutter 110 will be described next. The shutter 110, as shown in FIG. 15, is of a sliding type, and is slid along the longitudinal direction of the vehicle. There are guide rails 115 supporting both side ends of the shutter 110 in both sides of the opening 110a closed with the shutter 110 in the width-direction of vehicle. Both sides of the shutter 110 are supported with the guide rails 115 through four rollers 112. The guide rails 115 guide the top, bottom and side of the rollers 112. The shutter 110 is positioned on the reverse side of the containing dome 4 when the opening is open, and is fitted in the opening when the opening is closed. In other words, when the opening is closed, the upper surface of the shutter 110 is coextensive with the upper surface of the containing dome 4. The guide rails 115 have curves so as to move the shutter 110 as described above. A cylinder 42 for up- and down-ward driving of the shutter 110 is installed on the base plate 3.

Figure 16:
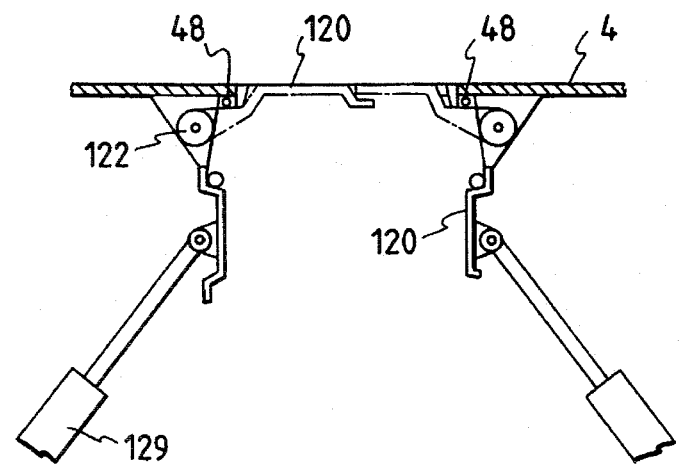
FIG. 16 is a vertical sectional view showing the main part of another shutter system.

The shutters 120 are, as shown in FIG. 16, opened and closed by turning with hinges 122 as turning axes. Cylinders 129 are installed on the base plate 3.

The shutters 130 are of a sliding type similar to the shutter 110. The guide rails 135 for the shutters 130 are not installed in the side portion of the opening. The reason for this is to prevent crossing over with the shutter 140. Therefore, the portion of the shutter to close the opening has no guide roller either. In order to put guide rollers on the shutter 130, the shutter 130 has such a shape that the shutter is largely extended toward the opposite side of the running direction when the opening is opened. Cylinders 139 are installed on the base plate 3. The other structure for the shutters 130 is the same as the structure for the shutter 110.

In FIG. 15 and FIG. 16, there are provided heaters 47 and 48 in the circumference of the shutters 110 and 120 of the containing dome 4. A heater may be provided at the portion where the shutters 120 contact each other, if necessary. The other shutters 130 and 140 also have heaters (not shown). When the shutters tend to freeze in winter season, the shutters 110, 120, 130 and 140 are opened after the heaters are supplied electric power to melt ice, and so the current collector 20 is easily controlled through its raising and lowering movements.

The shutters 140 are of a sliding type similar to the shutter 110. The guide rails 145 for the shutters 140 are not installed in the side portion of the opening. The reason for this is to prevent crossing over with the shutter 130. Therefore, the portion of the shutter to close the opening has no guide roller either. In order to put guide rollers on the shutter 140, the shutter 140 has such a shape that the shutter is largely extended toward the opposite side of the running direction when the opening is opened. Cylinders 149 are installed on the base plate 3. The other structure for the shutters 140 is the same as the structure for the shutter 110.

Figure 17:
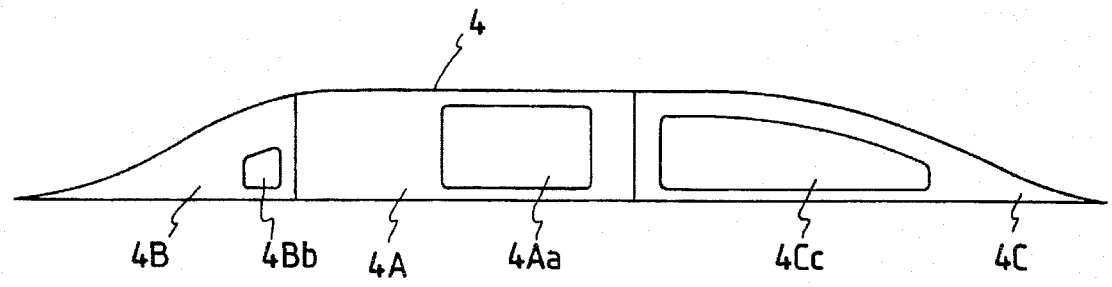
FIG. 17 is a enlarged side view of a containing dome.

The containing dome 4 is, as shown in FIG. 17, partitioned into three parts 4A, 4B, 4C. The containing dome part 4A is the region from the guide rail 135 for the shutter 130 to the guide rail 115 for the shutter 110. The containing dome 4 has inspection hatches 4Aa, 4Bb, 4Cc on the side surface of the containing dome in appropriate positions to be used for inspection, assembling and replacement of parts for the devices in the containing dome 4.

Figure 18:
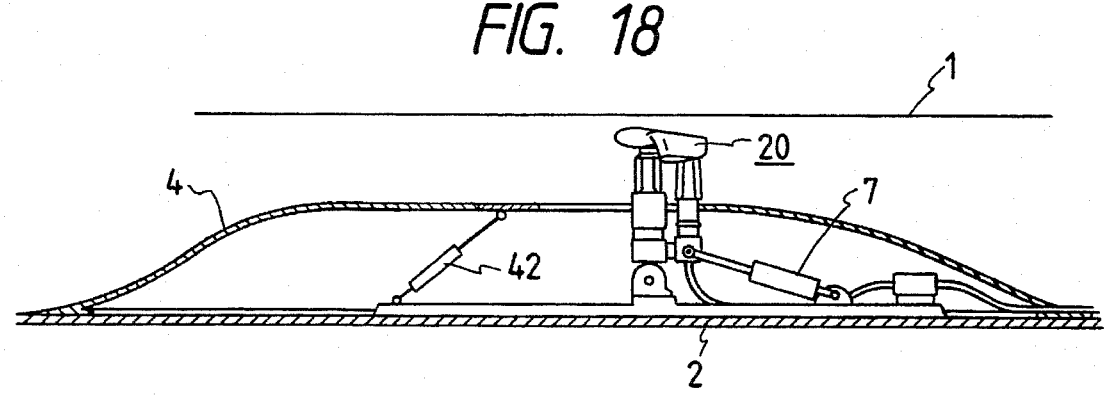
FIG. 18 is a view for explaining the operation of extending current collecting equipment from a containing dome.
Figure 19:
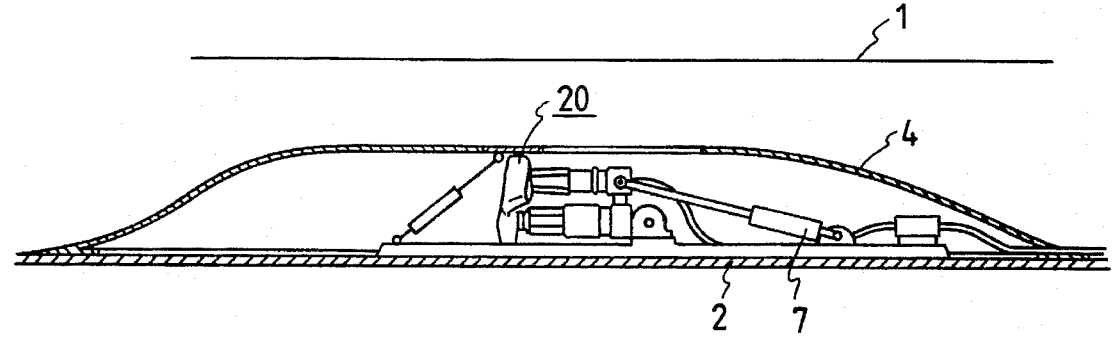
FIG. 19 is a view for explaining the operation of housing current collecting equipment in a containing dome.
Figure 20:
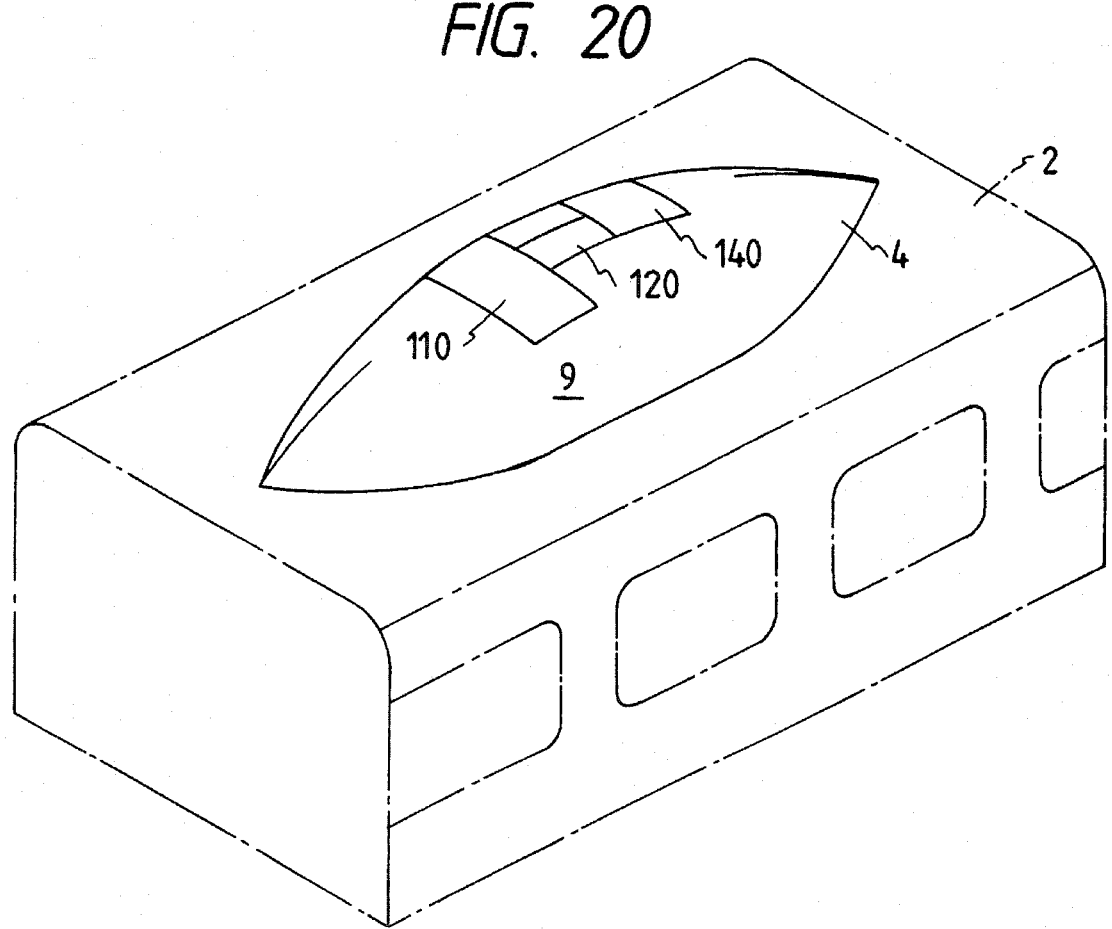
FIG. 20 is a perspective view of the external appearance showing the condition of housing current collecting equipment in a containing dome.

The current collector 20 projecting upward from the containing dome 4 is, as shown in FIG. 18 through FIG. 20, contained in the containing dome 4 by driving the cylinder 7. First, the collector head 22 is slightly pulled down (approximately 100 mm) to be detached from the trolley wire 1, as shown in FIG. 18. Next, as shown in FIG. 19, the shutter 9 is opened, and the current collector 20 is lowered completely into the containing dome 4, and then finally the shutter 9 is closed. The condition where the current collector 20 is contained in the containing dome 4 is as shown in FIG. 15, all the openings being closed with the shutter system 9, the external surface of the containing dome 4 being of a sooth stream-lined shape, which hardly produces running resistance or noise source during high speed running. The following shows an example of the detailed dimensions of an embodiment according to the present invention.

| | |
|---|---|
| height of containing dome | HD = 700 mm |
| total length of containing dome (hereinbefore referred to FIG. 4) | L = 9300 mm |
| width of base of containing dome | WDL = 2500 mm |
| width of top of containing dome (hereinbefore referred to FIG. 5) | WDH = 1800 mm |
| height of supporting insulator for insulation | HG = 500 mm |
| height of cable head for conduction | HC = 430 mm |
| height of front part of collector head | TA = 130 mm |
| length of current collector head in the running direction | LA = 600 mm |
| distance between top of cable head for conduction and trolley wire | TB = 290 mm |

Room sufficient to contain the driving cylinder 32, the connector 6, the cylinder for raising and flatting 7 and so on can be obtained when the movable stroke of the driving cylinder 32 is approximately 300 mm.

The assembling procedure will be described next. The current collector 20, composed of the collector head 22 and the driving cylinder 32, having the supporting insulator 30, the cylinder 7 for raising and lowering the current collector, the high voltage flexible cable 44 and the connector 6, are mounted on the base plate 3. The current collector 20 is in the condition where it is housed in the containing dome 4 (FIG. 14). At this time, the driving rod 31 is withdrawn into the cylinder 7, reducing its length. The top of the collector head 22 is set on a buffer base (not shown in the figure) installed on the base plate 3. Then, the cylinders 42, 129, 139, and 149 are secured to the base plate 3.

The assembled apparatus is mounted on the roof of the vehicle 2 and the base plate 3 is fixed to the roof with bolts. In this condition, the current collector 20 is in the housed condition. In this condition, the cylinders 42, 129, 139, and 149 may be also set in.

Next, the connector 6 and the cable 5 are connected. And, pipes for driving liquid are connected to each of the cylinders 7, 32, 42, 129, 139, and 149. The other work is to connect a signal wire to the sensor.

Then, the containing dome 4A is mounted on and fixed to the roof 2 with bolts. The shutters 110, 120, 130, and 140 have been attached to the containing dome 4A in advance. The cylinders 42, 129, 139, and 149 and the shutters 110, 120, 130, and 140 are connected by access through the inspection hatches.

Next, the end portions of the containing dome 4B and 4C are mounted on the roof and fixed to the roof 2 and the containing dome 4B. The portion connecting the domes to each other is of an over-lapping structure.

The replacement of the high voltage flexible cable 44 or the cable head 50 is carried out in such a manner that the containing dome 4 is removed in the condition where the current collector 20 is contained in the containing dome 4. The replacement work can be comparatively easily carried out, since the opening 55a of the base 55 is directed upward and the connector 6 is provided.

The cylinders 42, 129, and 139 may be horizontally installed in the containing dome 4B. When this is done, the dome 4 may be formed as a unit. Further, the inspection hatches may be miniaturized. The cylinders 42, 129, and 139 may be easily connected with the shutters and the containing dome 4. This assembling is carried out with the containing dome 4 turned upside down.

The shutters 130 in the containing dome 4, where the sleeve 59 penetrates, are also opened upward in an arc-shape. Each of the shutters 130 has two semi-circular openings. And, two holes are formed with closing of the two shutters 130. The sleeve 59 and the insulator 52 penetrate these two holes. The holes have rubber buffers on their peripheries. The hole for the sleeve 59 is slightly larger than the other, since the sleeve 59 moves upward and downward.

Figure 21A:
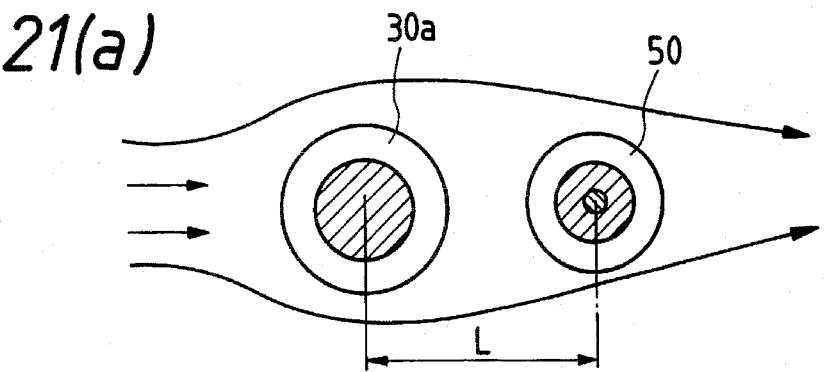
FIGS. 21(a) through 21(c) are horizontal sectional views of the supporting insulator and the conductive element, and relationships between air flow and the configuration.
Figure 21B:
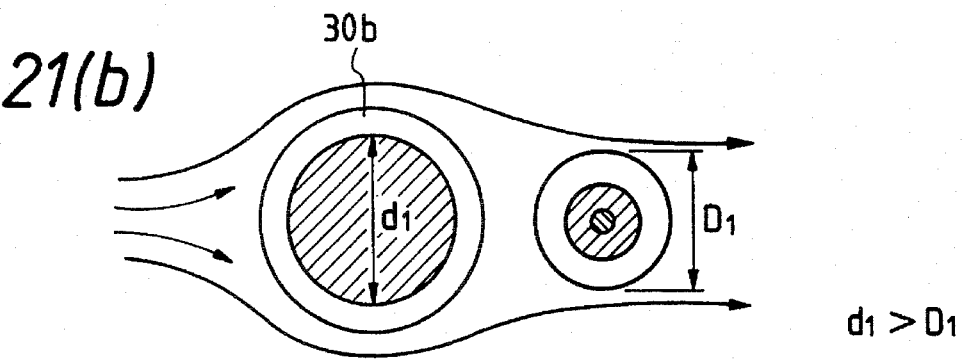
Figure 21C:
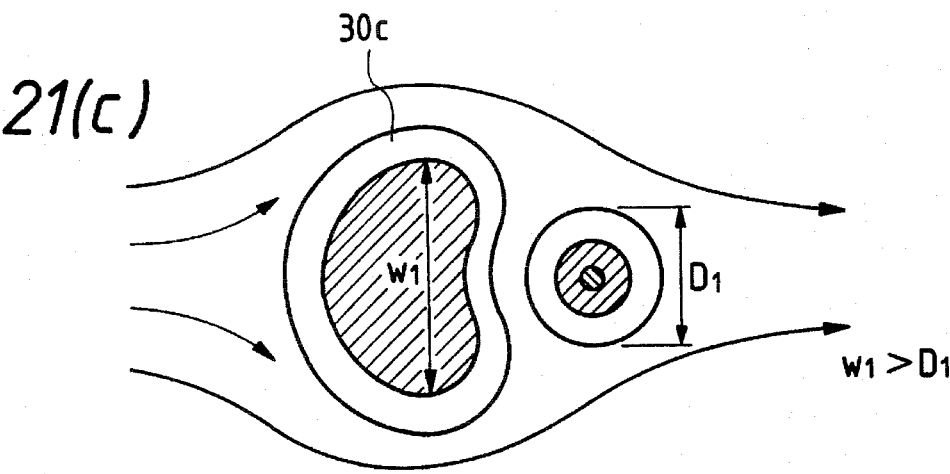

FIG. 21(a) through FIG. 21(c) show horizontal sectional views of the supporting insulator 30 (30a, 30b, 30c) and the cable head 50, and relationships between air flow and the configuration.

The FIG. 21(a) shows a combination where the round-shaped support insulator for insulation 30a has a slightly larger diameter than the diameter of the round-shaped cable head for conduction 50 (the aero-dynamic diameters are nearly the same), and they are placed in the stream. Although the air flow mainly hits the support insulator 30 which is placed in front in the running direction, the air stream also hits the cable head 50 to produce noise in some cases.

The FIG. 21(b) shows a combination where the support insulator 30b has a significantly larger diameter d1 than the diameter D1 of the cable head 50. The air flow mainly hits the support insulator 30 which has a large diameter and is placed in front in the running direction, and the air does not hit the cable head 50. This results in a decrease in noise totally.

$d_1 > D_1$ $d_1$ and hatched part: concave portion of the insulator 30
$D_1$ outer diameter: convex portion of the cable head 50 insulator The FIG. 21(c) shows a combination where the support insulator 30c is formed to have a wide width perpendicular to the air flow and a nearly stream-line shape, so that the cable head 50 is actively hidden within the protected area of the supporting insulator 30. When this is done, the noise decreases more than the case FIG. 21(b). It is desirable that the diameter or width of the supporting insulator 30 is, as described above, larger than the diameter of the cable head 50. Incidentally, the supporting insulator 30 is made of epoxy resin.

The distance L between the two insulators 30 and 52 is determined from the low noise point of view. It is thought that interference of two noises may lower the noise. Although the diameters of the supporting insulator 30 and the cable head insulator 52 are the same size from the top to the bottom (above the containing dome 4), the diameters may be varied, for example, such as to increase in the downward direction. When this is done, it is expected that the noise may be lowered since the air flow varies in the vertical direction.

Figure 22:
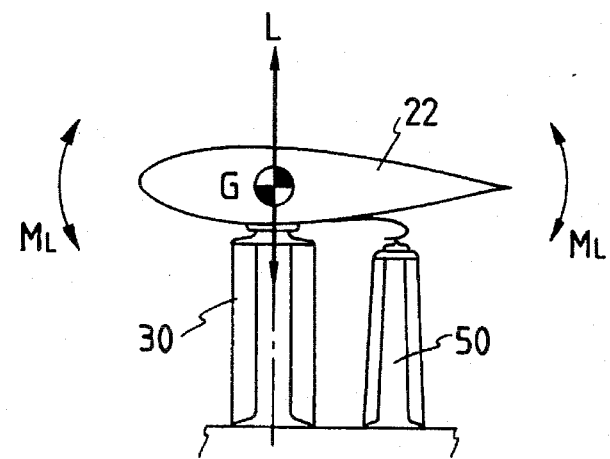
FIG. 22 is a vertical sectional view showing the positional relationship between the current collecting member and the supporting insulator.

Further, as shown in FIG. 22, it is desirable that the supporting insulator 30 is placed just below the center of gravity G of the collector head 22, that is the position on which the weight of said collector head 22 acts and the lift force L caused by the air flow hitting said collector head acts. A lift force L acts on said collector head 22 during vehicle running. When the vertical sectional shape of said collector head 22 is symmetric with respect to a horizontal plane, the velocity in the downside thereof is lower than the velocity of the upside thereof since said supporting insulator 30 is installed. Therefore, the lift force acting in said collector head 22 acts upward. When the position of the lift force acting on the collector head 22 is at the position of the center of gravity G and said supporting insulator 30 is installed at that position, the angular moment ML shown in the figure is not caused. This means that no excessive force acts on the supporting insulator 30.

It is desirable that the acting position of the center of gravity G of said collector head 22 agrees with the acting position of the lift force of said collector head 22. In a case where it is hard to cause said position of the center of gravity G to correspond with the acting position of the lift force, it is desirable to make them as close as possible.

It is thought that the containing dome 4 may cause upward turning of the air flow. As a countermeasure against this problem, the collector head 22 may be tilted so as to match the angle of the air flow, or the collector head 22 may be moved to a place where there is no effect of the angle of air flow caused by the containing dome 4. Therein, it is desirable that the angle and the movement of the collector head 22 are adjusted corresponding to the speed of the vehicle.

Figure 23:
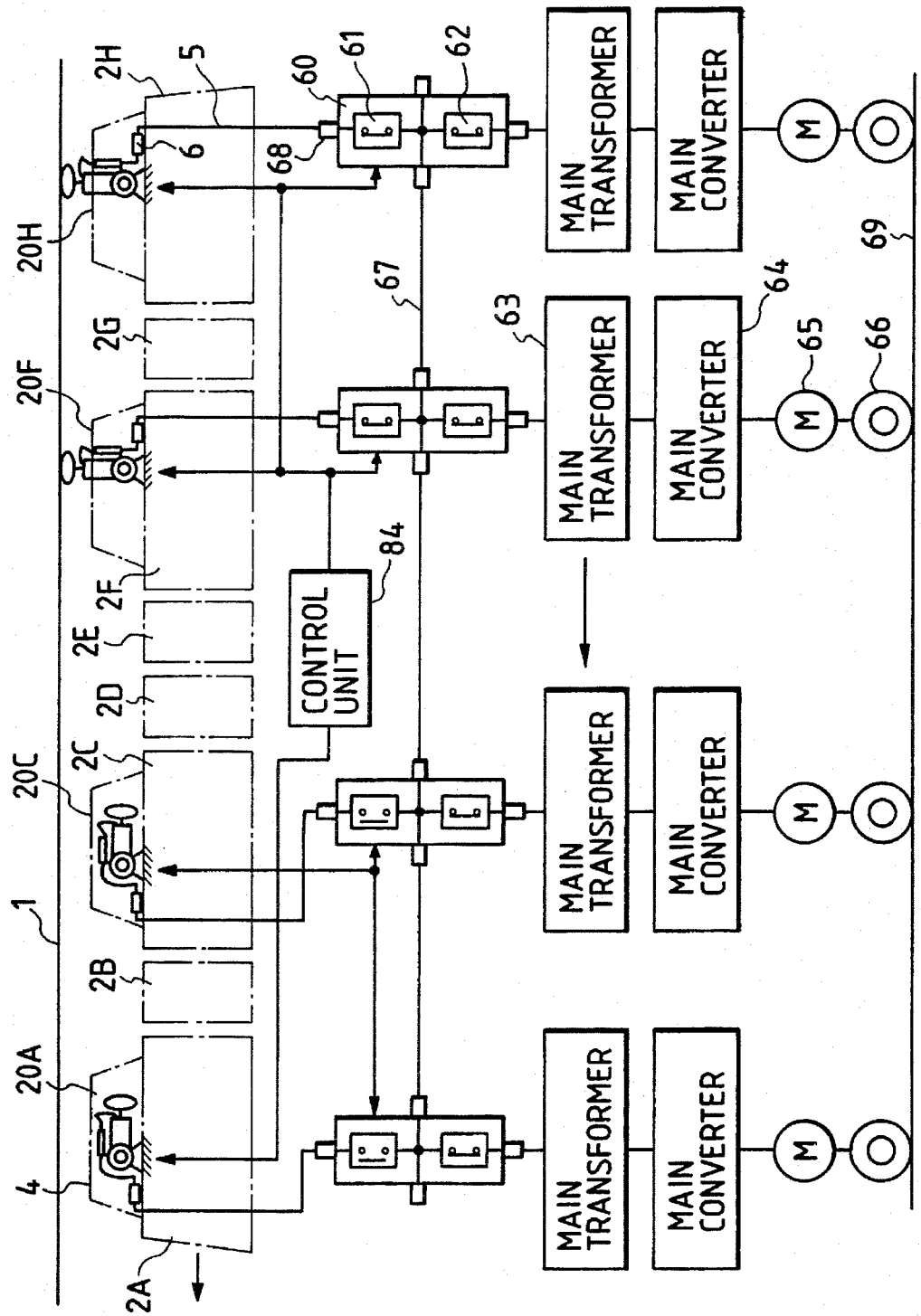
FIG. 23 is a schematic circuit diagram showing an example of the electric wiring in a train of vehicles applied to the present invention.

FIG. 23 shows an application to a train of vehicles of the present invention.

In this figure, the vehicles 2 (2A–2H) are running from the right hand side to the left hand side as shown with an allow. Generally, current collection is carried out with a vehicle in the rear of the train in order to decrease the aero-dynamic resistance and to lower noise by placing the current collector 20 in a place where a boundary layer more readily develops. Therefore, in the figure, the two current collectors (20F, 20H) in the rear are raised, and the two current collectors (20A, 20C) in the front are housed in the containing domes 4.

The electricity collected with the current collector 20 is directed to a high voltage unit box 60 through a high voltage connector 6 and a high voltage cable 5. In this high voltage unit box 60, there are installed a vacuum circuit breaker 61 and a vacuum circuit breaker 62 which are connected with a cable head for current conduction 68 and a high voltage take-out cable 67, respectively. The vacuum circuit breaker 61 prevents the lowered and housed current collector 20, which is out of use, from applying high voltage with other current collectors 20 through the high voltage take-out cable 67.

The vacuum circuit breaker 62 switches on and off current to current collector 20 installed in each vehicle. The current passed through the vacuum circuit breaker 62 in such a way is dropped in voltage with a main transformer 63, then the current is converted with a main convertor 64 into three phase alternating current having its frequency and voltage controlled corresponding to the speed and the traction force of the vehicle to drive a main motor 65. The current, after driving the main motor 65, returns to a rail 69 through a wheel and axle 66. A high voltage switch 61 cuts off high voltage from the current collector 20 at the time when the current collector 20 is housed.

Figure 24:
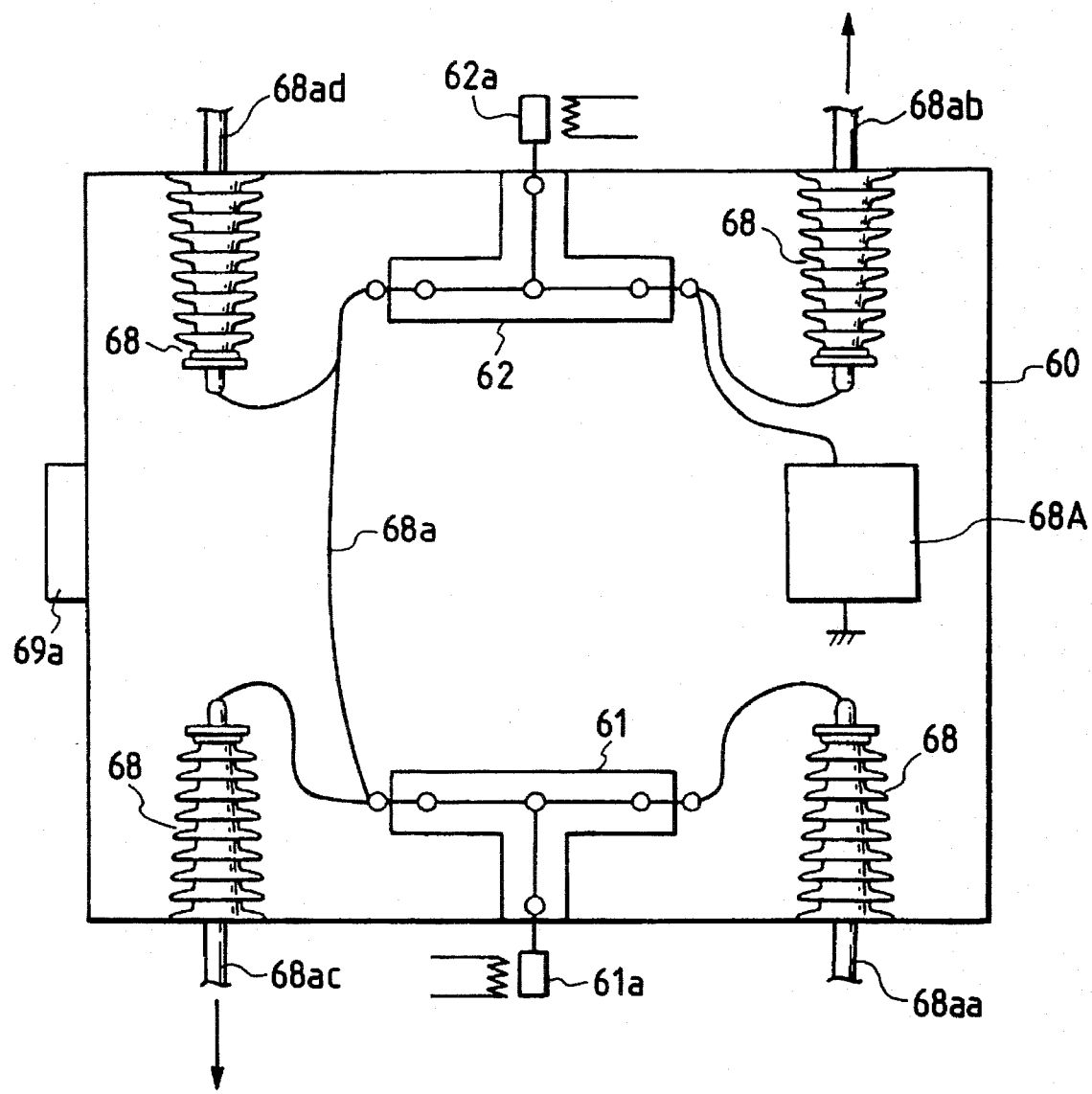
FIG. 24 is a vertical sectional view of the high voltage unit box in FIG. 23.

FIG. 24 shows an example of the arrangement of units in the high voltage unit box 60. There are installed two vacuum circuit breakers 61 and 62 and four cable heads 68 in one box 60. Although the inside of the high voltage unit box is at atmospheric pressure, the box is sealed. The vacuum circuit breaker 61 and the vacuum circuit breaker 62 are installed in the top and the bottom of the box 60. Bare wires 68a are used for connections among both of the vacuum circuit breakers 61, 62 and the insulators 68 for take-out conductors 68aa, 68ab, 68ac, 68ad. The vacuum circuit breakers 61 and 62, as known in the art, switch on and off the current in response to magnetic coils 61a and 62a. A cable 68aa is used for connecting to the high voltage flexible cable 44, a cable 68ab being used for connecting to the main transformer 63, cables 68ac and 68ad being used for connecting to the other unit boxes 60. The numeral 68A indicates an arrester which is connected to the vacuum circuit breaker 62. The vacuum circuit breakers 61 and 62 have the same specification. Since the vacuum circuit breaker 61 is installed under the floor of the vehicle, the center of gravity of the vehicle can be lowered as compared to when it is installed on the roof. Further, the two vacuum circuit breakers 61 and 62 are installed in one unit box 60, which also leads to a lowering of cost.

Figure 25:
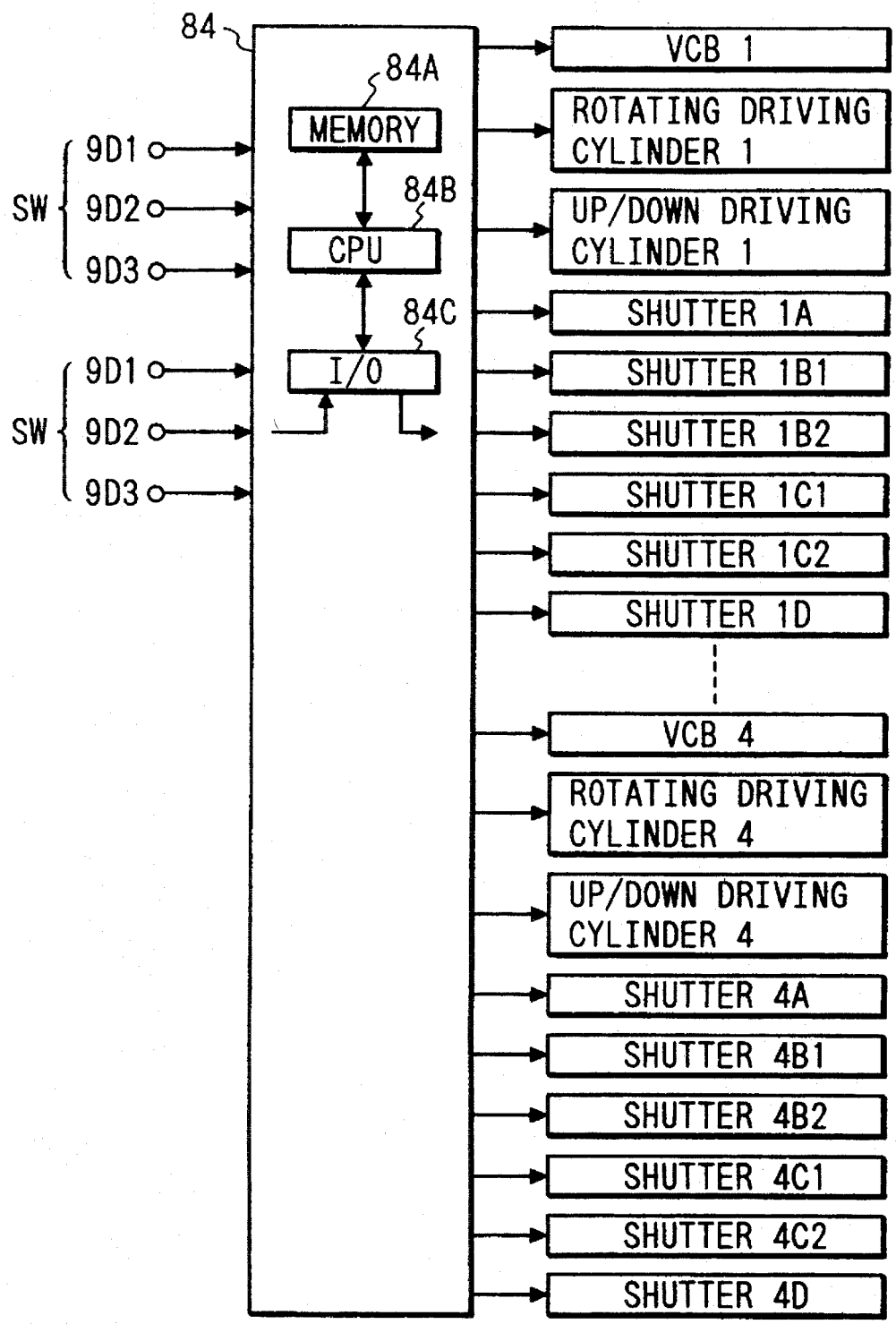
FIG. 25 is a block diagram showing a structure of the control system in FIG. 23

Each vehicle in a train of vehicles has a control unit 84 having the following structure as shown in FIG. 25. Since the train has four current collectors 20 (20A, 20C, 20F, 20H), the control unit 84 controls four sets. A set is composed of one vacuum circuit breaker 61, one driving cylinder 32, two cylinders 7 for raising and lowering the current collector, and six cylinders 42, 129, 139, and 149.

There are two sets of input switches SW, each of which is installed in each of the driving cabs on both end vehicles of the train. The one set of switches SW is composed of a switch 9D1 to instruct which vehicle in the train is the front vehicle, a switch 9D2 to raise all of the current collectors 20, a switch 9D3 to lower and house all of the current collectors 20 into the containing domes. The control unit 84 includes a memory 84A, a CPU 84B, and an input/output interface 84C.

Figure 26:
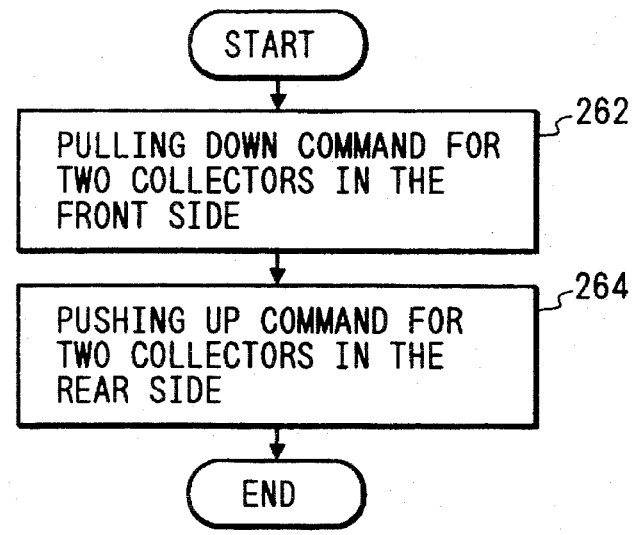
FIG. 26 is a diagram showing the flow of a control command for the current collecting equipment.

The CPU 84B executes a program stored in the memory 84A, and executes various kinds of processing. When the switch 9D1 for instructing which vehicle in the train is the front vehicle is switched on, the CPU 84B, as shown in FIG. 26, outputs a lowering command (262) to the two current collectors (20A, 20C) in the front side of the train and sends a raising command (264) to the two current collectors (20F, 20H) in the rear side.

Figure 27:
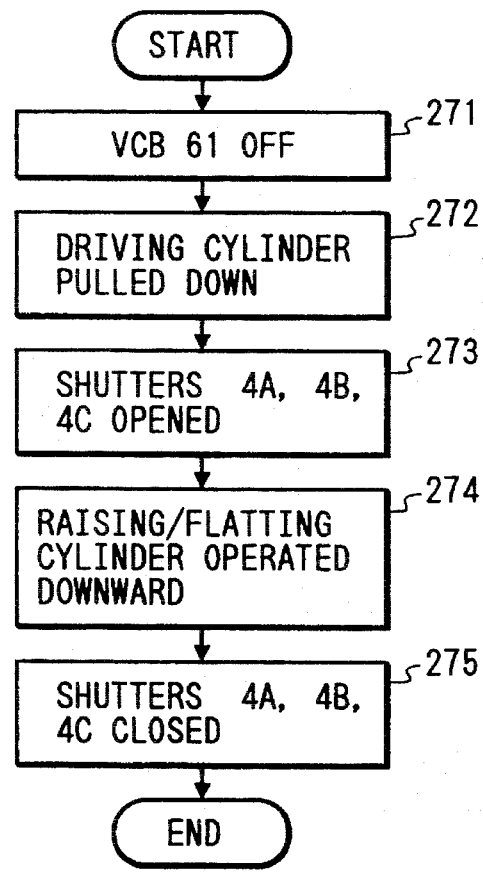
FIG. 27 is a flow diagram showing the operational procedure of a pulling-down command for the current collecting equipment.

The operating procedure according to said lowering command is as shown in FIG. 27. In the condition in FIG. 4, the vacuum circuit breaker 61 is cut off (271) to prevent sparking. Next, the driving rod 31 is lowered up to the lowermost position to realize the condition in FIG. 18 (272). And, the shutters 110, 120, and 130 are opened by using the cylinders 42, 129, and 139 (273). Next, the current collector 20 is housed in the containing dome 4 using the cylinder 7 as shown in FIG. 19 (274). Then, the shutters 110, 120, and 140 are closed by using the cylinders 42, 129, and 149 (275). Therein, since the shutters 120 are overlapped, the operation timings of the cylinders 129 are different from each other.

The current collector 20 is capable of being lowered with a small power, since the current collector 20 is first lowered with the driving rod 31 to be detached from the trolley wire 1. Further, lowering the current collector 20 makes the length of the shutters 120 short and also makes the length of the containing dome 4 short.

In the condition of lowering and housing the current collector 20, since the two openings on the shutter 130 (holes for the sleeve 59 and for the insulator 52) are closed with the shutter 140, it can be expected to lower the noise during running. Further, the inflow of rain or snow can be minimized.

Figure 28:
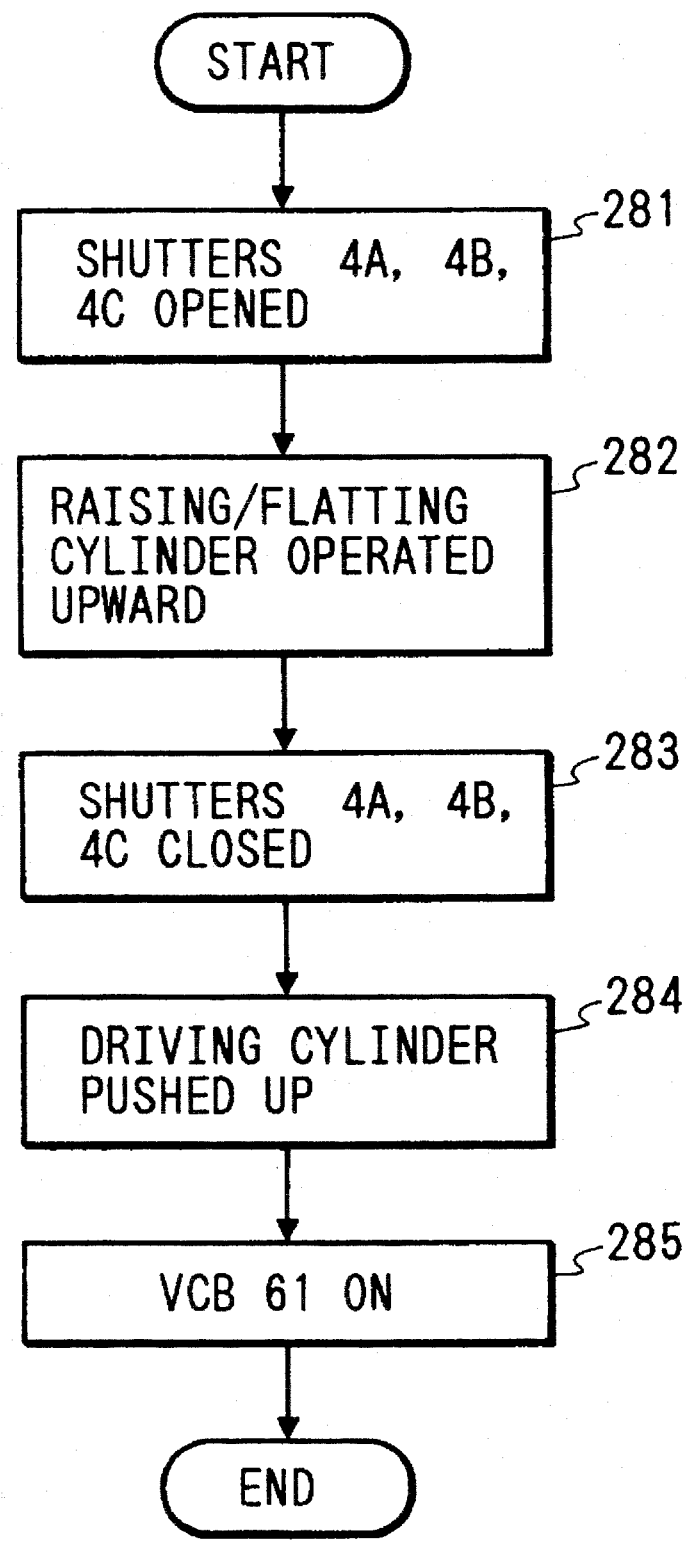
FIG. 28 is a flow diagram showing the operational procedure of a raising command for the current collecting equipment.

When a rising command for the current collector 20 is given in the step 264 in FIG. 26, as shown in FIG. 28, the shutters 110, 120, and 140 are opened (281), and the current collector 20 is raised (282), and then the shutters 110, 120, and 130 are closed (283). Next, the collector head 22 is raised using the driving rod 31 to contact the trolley wire 1 (284). Finally, the vacuum circuit breaker 61 is switched on (285). The effects are the same as described above.

A link mechanism may be installed between the insulator 30 and the driving cylinder 32 instead of using the driving rod 31 to move the insulator 30 upward and downward directly. When this is done, the driving cylinder 32 may be used also in place of the cylinder 7 for raising and lowering the current collector 20.

Figure 29:
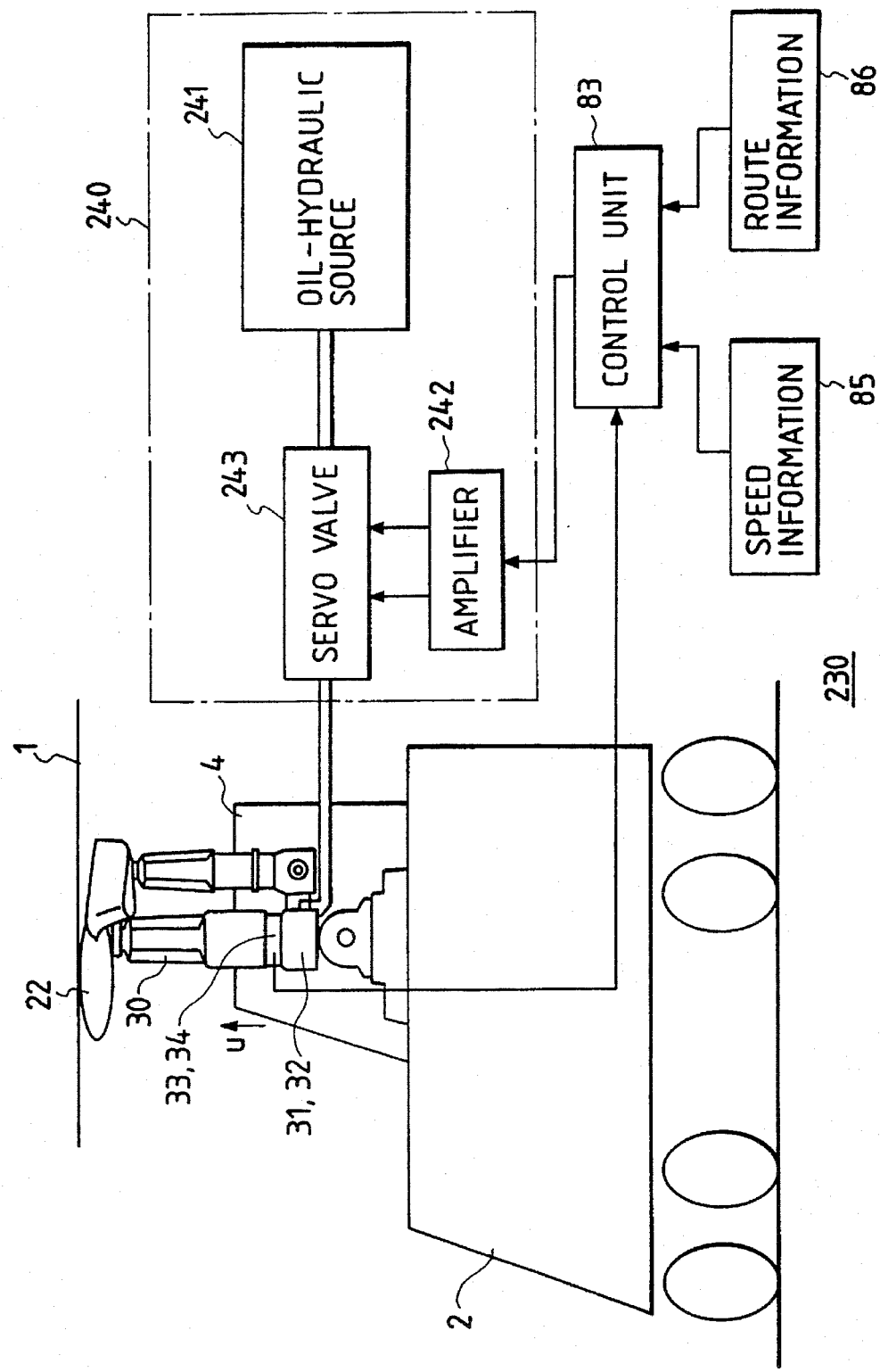
FIG. 29 is a block diagram showing the structure of an oil-hydraulic driving system for the current collecting equipment.
Figure 30:
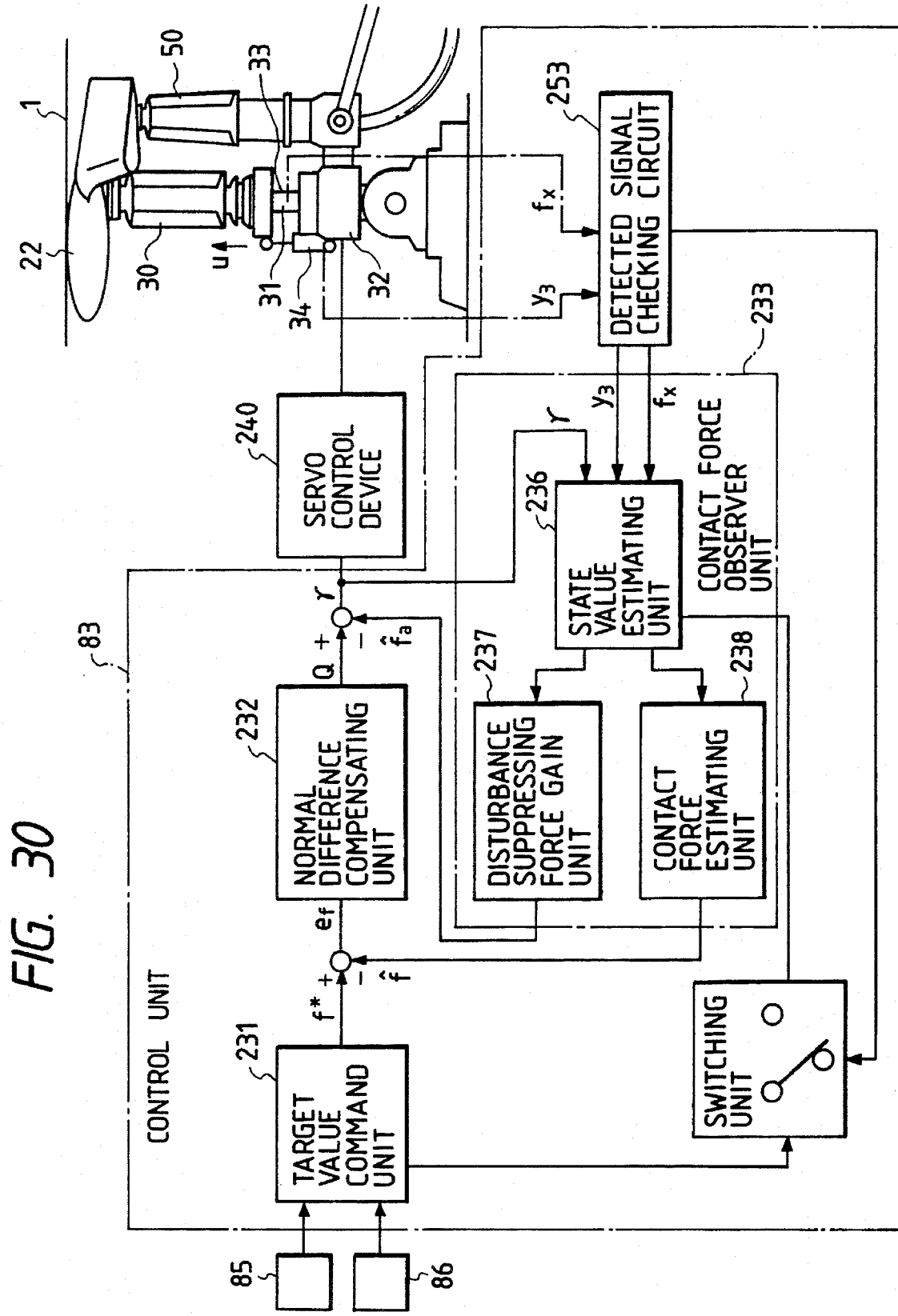
FIG. 30 is a block diagram showing the structure of a push-up force control system for the current collecting equipment.
Figure 31:
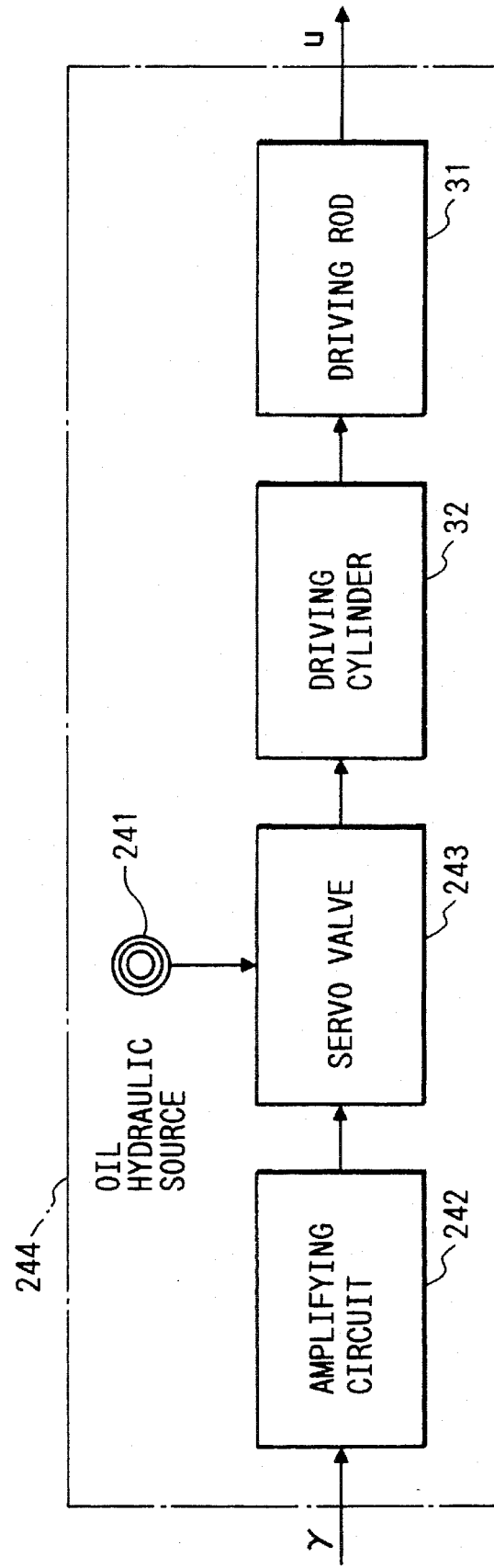
FIG. 31 is a block diagram showing the structure of a current collector driving system.

FIG. 29 through FIG. 31 show a structure of the collector head driving system 230 for vertical displacement control of the current collector 20. A load cell for control 33 and a displacement meter 34 are inserted between the supporting insulator 30 and the driving rod 31. The outputs from the load cell 33 and the displacement meter 34 are lead to a control unit 83 together with the output information from a speed information detector 85 and a railway information detector 86, and the control unit 83 calculates the optimum contact pressure against the trolley wire 1 and transfers an electric signal to a servo amplifier 242 in a servo control device 240. A servo valve 243 receives the electric signal from the servo amplifier 242 and controls the liquid flow from a oil-hydraulic source 241 with the electric signal to control the pushing-up force u between the driving cylinder 32 and the driving rod 31.

The following symbols are used in the description below.

$f^*$: target contact force $f_q$: lift force $f$: contact force $f_x$: fluctuating force signal $\hat{f}$: contact force estimated signal $\hat{f_a}$: disturbance suppressing force estimated signal $P$: estimating state value vector $A$: matrix constant $\hat{L}$: vector constant $C$: vector constant B: vector constant r: control signal=$k_2(f^*-f\hat{\,})-fa\hat{\,}$ u: pushing-up force $k_1'$: disturbance compensating gain $k_1''$: contact force gain $k_2$: normal compensating gain $a_1-a_8$: weight functions (forming $k_1'$)

a: equivalent mass of the trolley wire 1 b: equivalent damping coefficient of the trolley wire 1

$m_1$: mass of the contact strip 21

$m_3$: mass of the collector head 22 and the supporting insulator for insulation 30

$y_1, y_1', y_1''$: vertical displacement, vertical velocity, vertical acceleration of the contact strip 21

$y_3, y_3', y_3''$: vertical displacement, vertical velocity, vertical acceleration of the collector head 22 and the supporting insulator for insulation 30

$z, z', z'', z'''$: displacement, velocity, acceleration, acceleration ratio of the irregularities of the trolley wire 1

$c_1$: damping coefficient of the spring 23 for pus] the contact strip $k_1$: spring constant of the spring 23 for pushing the contact strip $\zeta$: ratio of damping coefficient X: state value vector W: disturbance vector D, E: vector constants H: vector constant Q: output state value vector from the normal difference compensating unit 232

F: scalar constant

G: vector constant

The servo control device 240 operates the driving cylinder 32 and the driving rod 31 with a control signal r from a control unit 83 to produce a push-up force u to the collector head 22, the support insulator 30 and so on. The control unit 83 is installed on the earth side (electric potential is zero) in the collector head containing dome 4 in the roof of the vehicle 2. The control unit 83 inputs a fluctuating force signal fx and a vertical displacement signal $y_3$ to a contact force observer unit 233. The signals are obtained through amplifying the output signals from a load cell 33 and a displacement meter 34 which are installed between the support insulator 30 and the driving rod 31, using a detected signal checking circuit 253. Further, the control signal r is fed at the same time to the contact force observer unit 233. Then, the contact force observer unit 233 outputs with estimation a contact force estimated signal f̂ and a disturbance suppressing force estimated signal fâ. The contact force observer unit 233 is composed of a state value estimating unit 236, a disturbance suppressing force gain unit 237 and a contact force estimating unit 238.

Furthermore, the control unit 83 has a target value command unit 231, which sets with optimizing and varying a contact pressure target value f* by means of the combination of information signal on running place and a detected signal on running speed, using the running information (speed information 85, route information 86) from the controller on the vehicle, and a normal difference compensating unit 232, which calculates said control signal r [=$k2 (f^*-f\hat{\,})-fa\hat{\,}$] through obtaining differences between the contact pressure target value f* set by the target value command unit 231 and the contact force estimated signal f̂ output with estimation by the contact force observer unit 233 or the disturbance suppressing force estimated signal fâ.

Herein, $k_2$ is a normal compensating gain in the normal difference compensating unit 232. The load cell 33 is installed between the support insulator 30 and the driving rod 31, and detects the load, either tension or compression, with high accuracy to output a fluctuating force signal fx.

Similarly, the displacement meter 34 is installed between the supporting insulator 30 and the driving cylinder 32, and outputs the vertical displacement, the velocity and acceleration of the driving rod 31. The lift force mainly acts on the collector head 22, the supporting insulator 30 and so on, and consists of the resultant lift force fq of average lift force and fluctuating lift force acting vertically. Therefore, when the vehicle runs at a high speed, the fq acting on the total body of the current collector 20 increases, and accordingly the contact pressure f substantially varies.

Said contact pressure is expressed with an equation (Equation 1).

$$f=fx-m_1 y_1''-m_3 y_3''-fq \qquad \text{(Equation 1)}$$

wherein, the $y_1, y_1', y_1''$ are the displacement, velocity and the acceleration of the current collector contact strip 21 and so on. The $y_3, y_3', y_3''$ are the displacement, the velocity and the acceleration of the collector head 22, the supporting insulator for insulation 30 and so on.

The target value command unit 231 sets with optimizing and varying the contact pressure target value f* by using the running information (running speed, running route, position, weather, running time, earthquake etc.) transferred from a vehicle controller. The normal difference compensating unit 232 receives an input signal which subtracts the contact force estimated signal f̂ from the f* set by the target value command unit 231, and outputs the signal Q [=k2 (f*-f̂)] which is obtained through multiplying the compensating gain $k_2$ and the signal ef. The control signal r, which is obtained by subtracting the disturbance lift pressure estimated signal fâ from Q through a subtractor, is input to the servo control device 240. The driving rod 31 is operated using the control signal r so as to suppress the lift force fq and the external force from the trolley wire 1.

In order to calculate the disturbance suppressing force estimated signal fâ, the disturbance suppressing force gain unit 237 multiplies the following weight functions of the disturbance compensating gains $k_1'$ ($a_1-a_8$) to the output signals ($y_1, y_3, y'_1, y'_3, z, z', z'', z'''$) from the state value estimating unit 236, which contains the lift force fq and the external force from the trolley wire 1. Wherein, z, z', z'', z''' are the displacement, the velocity, the acceleration and the acceleration ratio of the convex and concave of the trolley wire 1.

$a_1=268,500$, $a_2=-268,500$, $a_3=-28,650$, $a_4=-1,212$, $a_5=0$, $a_6=29,850$, $a_7=45$, $a_8=0$.

Then, fâ can be obtained.

$$fa\hat{\,}=k_1' \times P \qquad \text{(Equation 2)}$$

The contact force estimating unit 238 calculate s the contact force estimated signal f̂ (the equation (Equation 3)) using the output signals P ($y_1, y_3, y'_1, y'_3, z, z', z'', z'''$) from the state value estimating unit 236. Wherein, a is an equivalent mass of the trolley wire 1, and b is an equivalent damping factor of the trolley wire 1.

$$f = [-ak_1y_1/(m_1 + a) + ak_1y_3/(m_1 + a) +$$

$$(bm_1y_1' - ac_1y_1')/(m_1 + a) + ac_1y_3/(m_1 + a) -$$

$$bm_1z'/(m_1 + a) - am_1z''/(m_1 + a)]$$

This equation can be expressed as follows, $$f\hat{} = k_1''xP \quad \text{(Equation 3)}$$

Therein, $k_1$ is the spring constant of the pushing spring 23 for the contact strip, $c_1$ is the damping coefficient of the pushing spring 23 for the contact strip, and $k_1''$ is the contact force gain.

The signal P described above will be explained next. After judging whether or not the output signals detected with the load cell 33 and the displacement meter 34 are normal, using the detected signal checking circuit 253, the varying signal fx and the vertical displacement $y_3$ together with said control signal r is input to the state value estimating unit 236, and then the unit 236 outputs the eight state values described above, $y_1$, $y_3$, $y'_1$, $y'_3$, $z$, $z'$, $z''$, $z'''$, through state estimating by means of the minimum dimension observer method. The calculation to obtain the state values using the minimum dimension observer method (Gopinath's method) is described in the book titled "Observer" published from Corona Co. (1988) page parts 21–32. The equations of state (Equation 4) are shown below.

$$d/dt(P) = (A - L\hat{}C)xP + BxU + L\hat{}xF_x \quad \text{(Equation 4)}$$

Wherein, the P is an estimated state value of observer ($y_1\hat{}$, $y_3\hat{}$, $y'_1\hat{}$, $y'_3\hat{}$, $z\hat{}$, $z'\hat{}$, $z''\hat{}$, $z'''\hat{}$), the $F_x$ being an input scalar to the force detector, the A being an 8×8 matrix, the L$\hat{}$ being a 1×8 vector, the C being a 1×8 vector, the B being a 8×1 vector. Therefore, since the eight characteristic roots of the collector 20 are on the points (−0.128, j±12.34), (−1.212, j±121.84), (−1.88, jO), (−23.69, jO), (−27.67, ±j98.19) in the complex coordinate, the seven observer characteristic roots of the state s estimating unit 236 are determined on the complex coordinate in such a manner as follows. That is to determine the roots of the matrix (A−L$\hat{}$C) in the equation (Equation 4).

(−6.0, ±j12.34), (−23.69, j+0), (−27.67, ±j98.19), (−60, j±121.84)

As can be understood from these points, the roots, (−6.0, ±j12.34) and (−60, j±121.84), are determined such that the damping characteristics for the two roots depending on the disturbance, (−0.128, j±121.84) and (1.212, j±121.84), are improved ($\zeta$=0.01=>0.44).

A method for active control of the disturbance suppression force using the contact force observer unit 233 will be described next. The equation of the state for the collector 20 including the external force of the trolley wire 1, the lift force and so on is expressed as follows:

$$d/dt(X) = AxX + BxU + DxW \quad \text{(Equation 5)}$$

$$f = CxX + ExW \quad \text{(Equation 6)}$$

Wherein, X is a state value $y_1$, $y_3$, $y'_1$, $y'_3$, $z$, $z'$, $z''$, $z'''$ vector, the pushing-up force vector u=HxR, r being a control signal vector, H being a vector constant, f being an output scalar for the contact force, W being an input scalar of the disturbance, A being an 8×8 matrix, B being an 8×1 vector, C being a 1×8 vector, D being an 8×1 vector, E being a 1×8 vector.

And, the equation of state for the normal difference compensating unit 232 is expressed as follows.

$$d/dt(Q) = FxQ + G(f^* - f\hat{})$$

Then, the following equation can be obtained.

$$Q = k_2(f^* - f\hat{}) \quad \text{(Equation 7)}$$

Wherein, $k_2$ is the normal compensating gain vectors Q is an output state value (1×1) vector of the normal difference compensating unit 232, F being a scalar constant, G being a vector constant, ($f^* - f\hat{}$) being an input scalar to the force difference value control signal.

$$\begin{aligned} u &= H \times r \quad &\text{(Equation 8)} \\ &= H \times (Q - f\hat{a}) \\ &= H \times (Q - k_1' \times P) \\ &= K_1 \times P + K_2 \times Q \end{aligned}$$

Therein, $k_1'$ and $K_2$ are vector constants, and there are the relationships $K_1$=Hx$k_1'$ and $K_2$=H. From Equation 5–Equation 8, all the equations of state for the optimum contact pressure target value f* and the contact pressure f and the push-up force u are expressed as follows.

$$d/dt \begin{bmatrix} X \\ Q \end{bmatrix} = \begin{bmatrix} A + Bk1, & Bk2 \\ -GC, & F \end{bmatrix} \times \begin{bmatrix} X \\ Q \end{bmatrix} + \begin{bmatrix} O \\ G \end{bmatrix} \times [f^*opt] + \begin{bmatrix} D \\ -G \times E \end{bmatrix} \times W$$

Therein, $$X = [y_1, y_3, y'_1, y'_3, z, z', z'', z''']^T \quad \text{(Equation 9)}$$

$$f = [C, O] \begin{bmatrix} X \\ Q \end{bmatrix} + E \times W \quad \text{(Equation 10)}$$

Thus, using Equation 7 through Equation 10, the contact force can be decreased by inputting said control signal r for the pushing-up force u (Equation 8) based on fa$\hat{}$ and f$\hat{}$ to the servo control device 240, fa$\hat{}$ and f$\hat{}$ are obtained through inputting said control signal of the varying force signal fx and the push-up force u to the contact force observer unit 233. The disturbing compensating gain $k_1'$, the vector constant H and the compensating vector F/G used at this time are required to be selected properly.

FIG. 31 shows a structure of the current collector driving system 244 which receives said control signal r to output the pushing-up force u. The system 244 is composed of an amplifying circuit 242 to amplify said control signal r, a servo valve 243 to control the oil pressure from an oil-hydraulic pressure source 241, a driving cylinder 32 and a driving rod 31 to produce the pushing-up force u by the action of expansion and contraction caused by the servo valve 243.

Although an oil-hydraulic pressure source 241 is used in this example, a compressed air source may be used, as described later, when the response of the servo valve and cylinder is fast enough. In this case, the transfer characteristic of the pushing-up force u corresponding to said control signal r is required to be of the same order.

Figure 32:
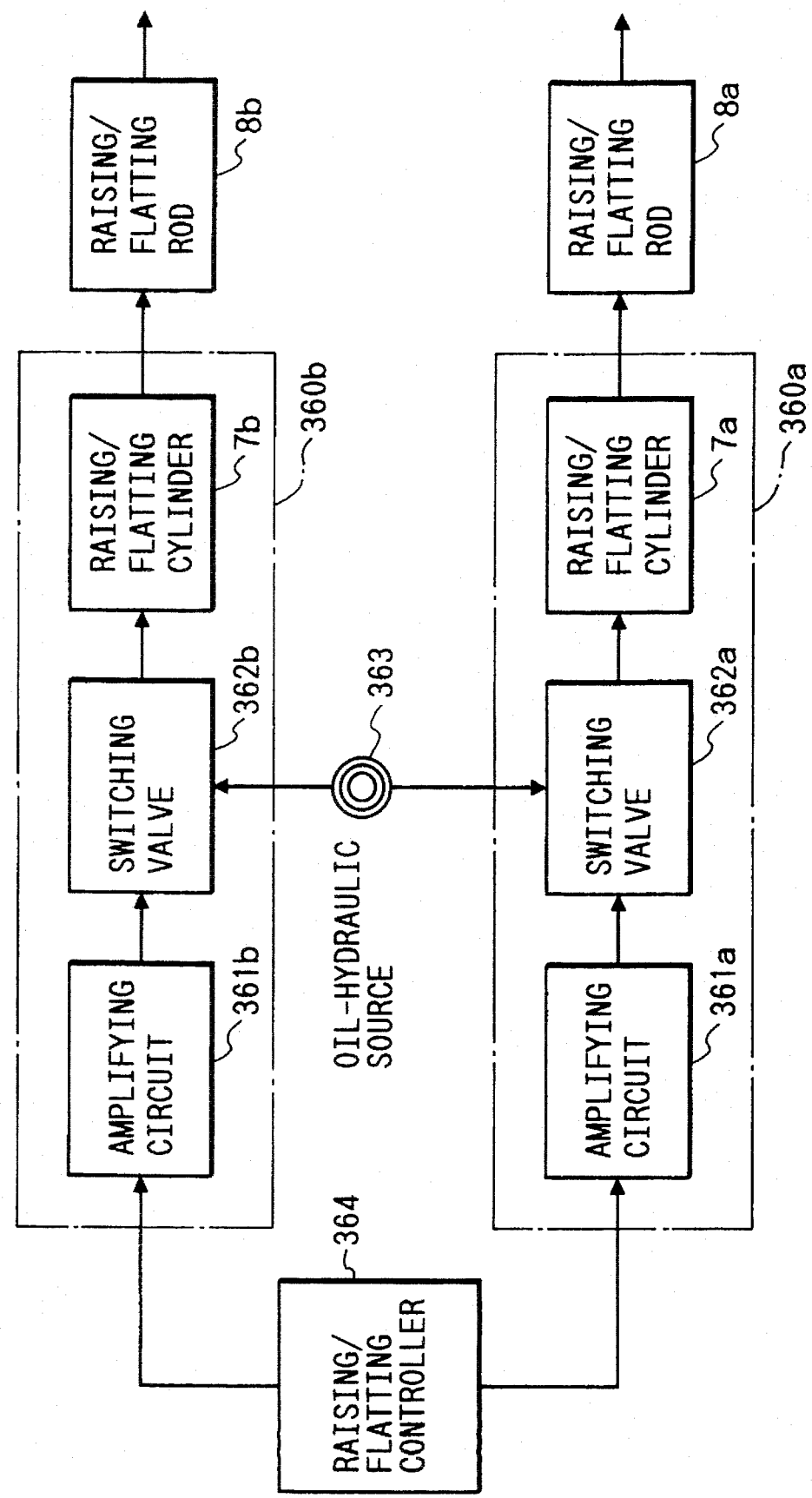
FIG. 32 is a block diagram showing the structure of a containing driving system.

FIG. 32 is a block diagram showing the operation of the two containing systems 360a and 360b to lower and house the collector head 22 in the containing dome 4, wherein the two rods for raising and lowering 8a and 8b are operated to expand and contract and the collector 20 is operated to rotate through the rotating system 40. The two containing systems 360a and 360b are composed of amplifiers 361a and 361b. switching valves 362a and 362b, cylinders for raising and lowering 7a and 7b. When the containing systems receive the operation signal from the controller for raising and lowering 364 installed in the containing dome 4, the containing systems are operated with oil-hydraulic pressure from the oil-hydraulic pressure source 363 to raise the current collector 20 perpendicular to the car body 2 with the rods 8a and 8b, as shown in FIG. 18, so as to collect current from the trolley wire 1. On the other hand, when the current collector 20 is to be lowered, the containing system disconnects the contact strip from the trolley wire 1 and lowers it into the containing dome 4 using the projecting rods 8a and 8b, as shown in FIG. 19.

Another embodiment of the present invention may be realized with use of motors for driving the current collector 20 instead of oil-hydraulic pressure.

For a comparatively low running speed vehicle, the shutter system for the containing dome 4 is not required. Since the containing dome 4 itself has a substantial effect to decrease noise, the opening, through which the current collector 20 is put out or into, may be kept open.

Figure 33:
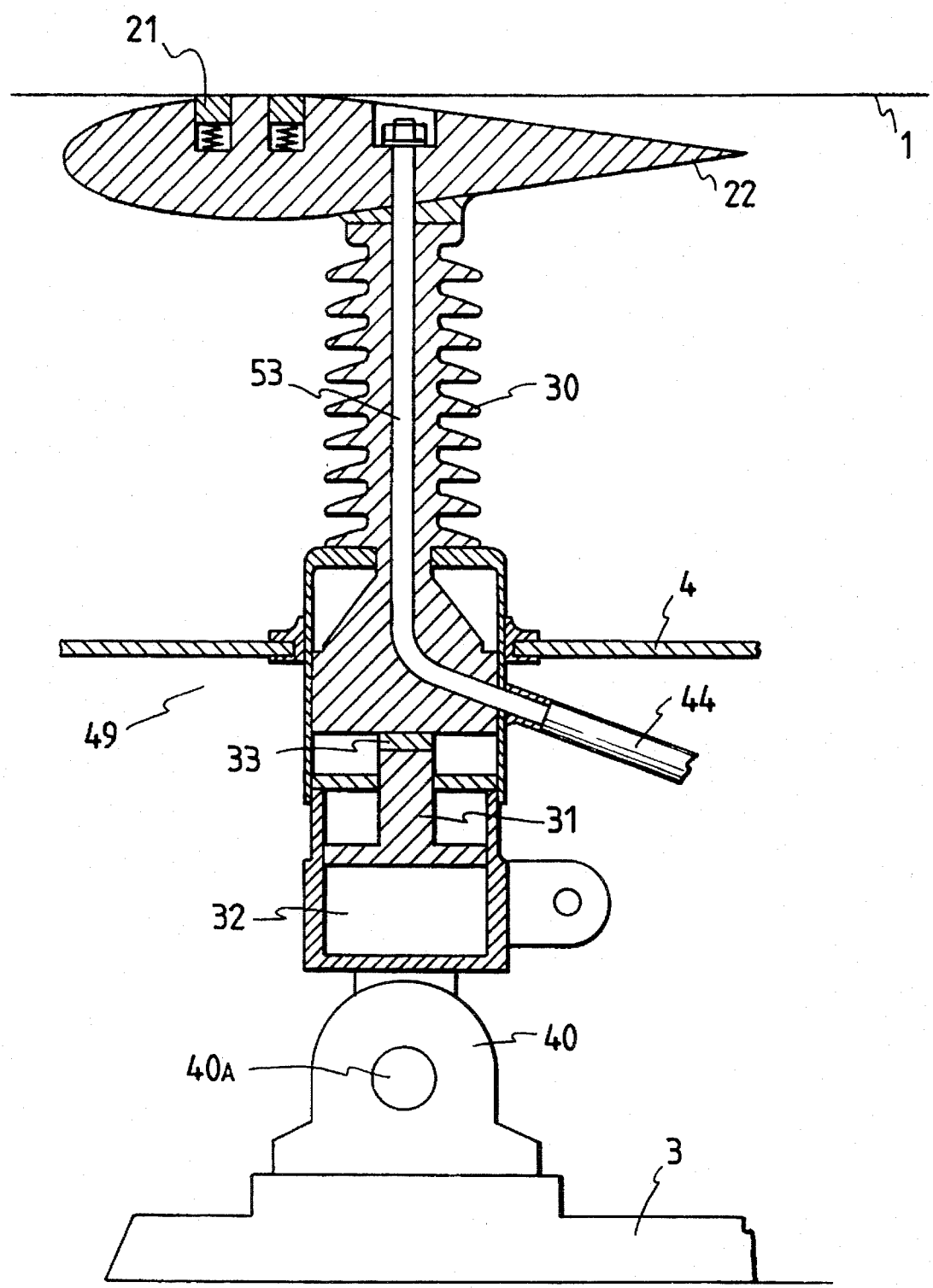
FIG. 33 is a vertical sectional view of current collecting equipment forming another embodiment according to the present invention.

FIG. 33 shows a further embodiment of the present invention where a high voltage flexible cable 44 for current conducting is held in the hollow portion of the supporting insulator 30. A conductor 53 is installed in the inside of the insulator to support a collector head 22. In other words, a cable head for current conduction supports the collector head 22. The high voltage flexible cable 44 is drawn out of the side of the insulator 30. The collector head 22 is fixed with a nut and a screw which is formed on the top end of the current conductor in the cable head 22. Therewith, there is an advantage in that a structure having only one insulator can be realized.

However, it is undesirable for the life of the high voltage flexible cable 44, since the high voltage flexible cable 44 moves upward and downward accompanied with the operation of the driving rod 31.

Figure 34:
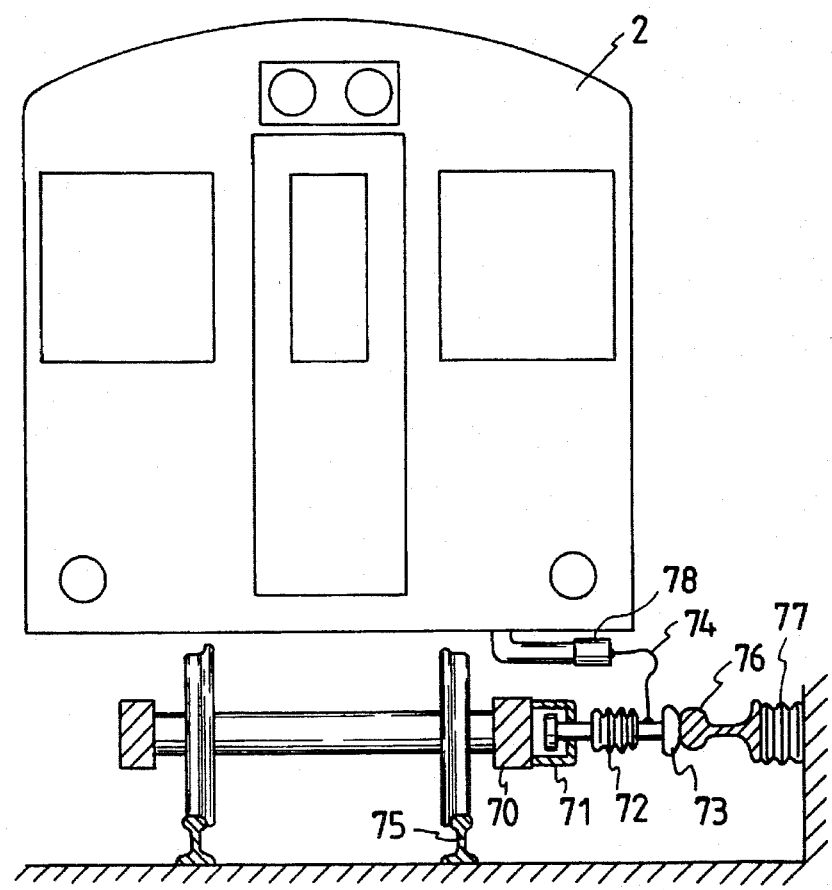
FIG. 34 is a view showing an example of the structure applied by the present invention to a current supplying system of a third rail type.

FIG. 34 shows another embodiment of the present invention which is applied to a current collecting system of a third rail type.

In this embodiment, the present invention is applied to a vehicle which collects current from a third rail installed on the side of the rail-way instead of current collecting from a trolley wire installed above the vehicle.

The current collecting of this type is widely used for a subway vehicle, wherein the positive voltage is applied to the third rail 76 installed on the side of the rail-way to miniaturize the tunnel cross section, and a negative voltage is applied to the rails 75 on which the vehicle runs. The third rail 76 is insulated with insulators 77. Current collecting is performed by pushing a current collecting shoe 73 against the third rail 76.

There is an insulator 72 on the vehicle side of the current collecting shoe 73 to insulate the high voltage from the vehicle, and there is an oil-hydraulic cylinder 71 on the further vehicle side to control the pushing force for the current collecting shoe 73. The oil-hydraulic cylinder 71 is fixed to an axle box body or a bogie frame 70 having small displacement with respect to the rails 75. The electricity collected by the current collecting shoe 73 is transferred to a cable head 78 through a flexible conductor 74 and then is supplied to a control system installed on the vehicle 2.

Figure 35:
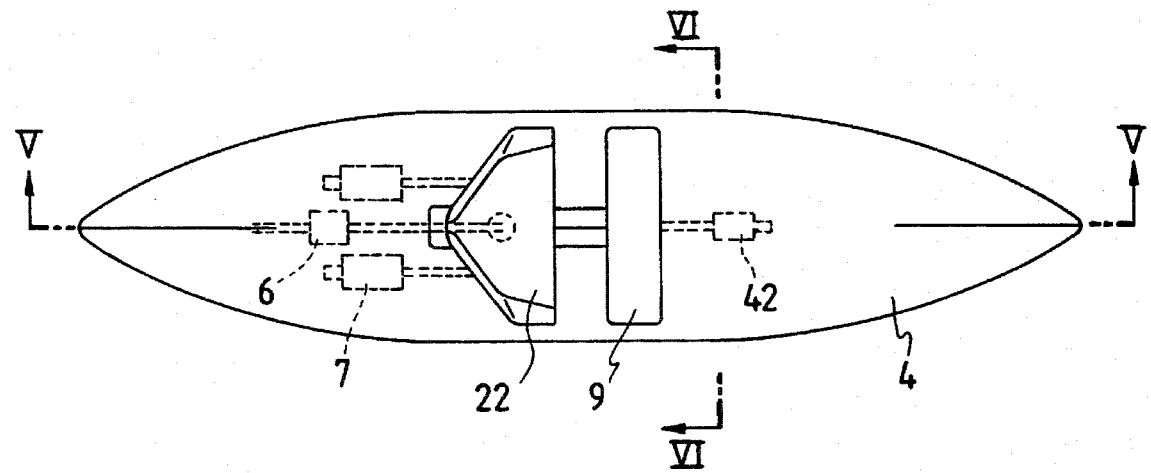
FIG. 35 is a plan view showing a further embodiment of current collecting equipment and a containing dome according to the present invention.
Figure 36:
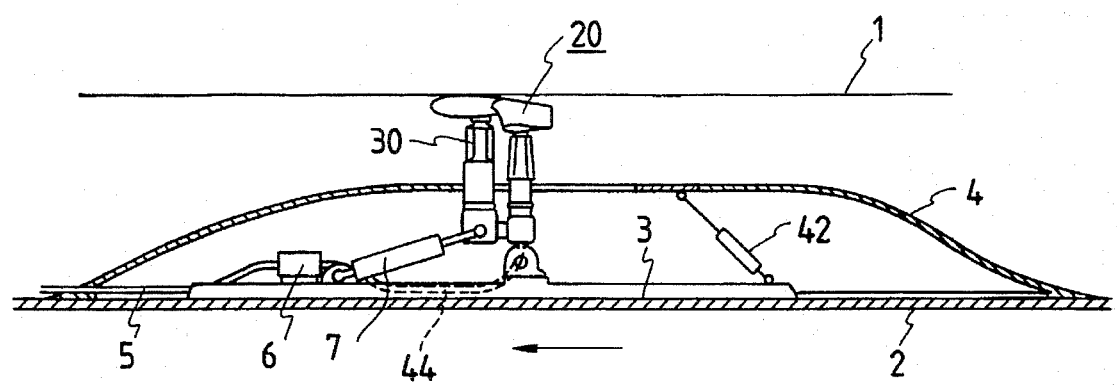
FIG. 36 is a view showing a cross section taken on the plane of the line V—V in FIG. 35.
Figure 37:
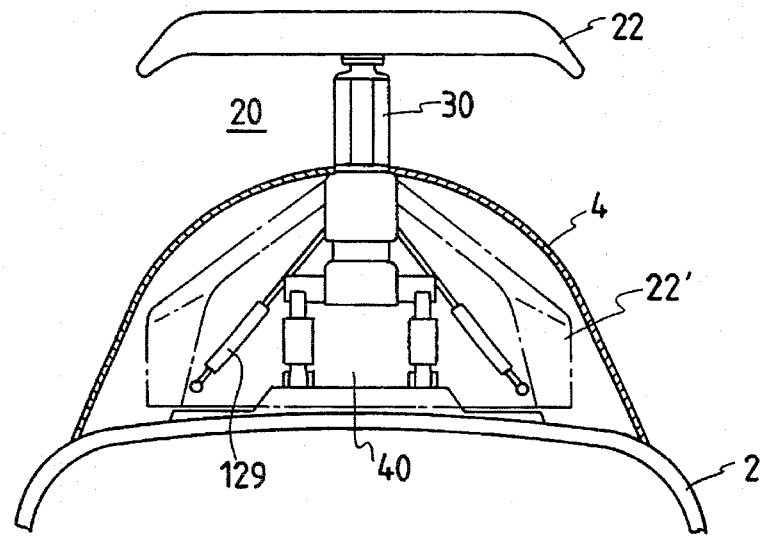
FIG. 37 is a view showing a cross section taken on the plane of the line VI—VI in FIG. 35.
Figure 38:
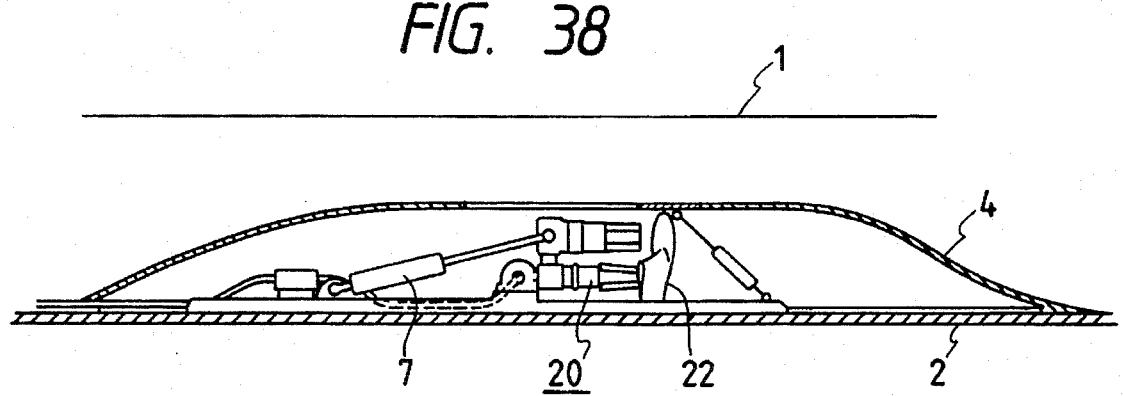
FIG. 38 is a view showing the contained condition of the current collecting equipment in FIG. 35.

FIG. 35–FIG. 37 show a further embodiment of the present invention. In this embodiment, the current collector 20 is rotatably flatted rearward with respect to the running direction. There are cylinders 7 and a connector 6 on the front side position in the running direction indicated with an allow. A high voltage flexible cable 44 is positioned between the branches of a hinge supporting the current collector 20. The domes 4A, 4B, 4C are inversely positioned in the running direction with respect to the embodiments described above.

Therein, when the current collector 20 is housed in the containing dome 4, the vertex of a triangle of the collector head 22 comes to the upper side. Therefore, the size of the containing dome 4 can be miniaturized as compared to the embodiments described above, which decreases the running resistance. This can be easily seen from a comparison of FIG. 37 with FIG. 5, for example.

Although the supporting insulator 30 is kept standing upright during running in the above embodiments, it is possible that the tilting angle of the support insulator 30 may be varied corresponding to the running speed by operation of the cylinders 7 for raising and lowering the current collector to control the wing force. In this case, it is desirable that the current collector contact strip 21 and the collector head 22 are formed to be arc-shaped. Further, when the wind from the containing dome strongly affects the current collector 20, it is desirable to move the current collector 20 toward the running direction.

Since the lift force acts on the collector head 22 during high speed running, the collector head 22 is controlled such that the top front of the collector head 22 is directed slightly downward using the cylinder 7. In FIG. 32, the controller for raising and lowering 364 operates the cylinder 7 such that the top front of the collector head 22 is directed slightly downward when the vehicle runs faster than a given running speed using the running speed information from a controller on the vehicle. And, the command from a central operation room is also used.

Since the lift force becomes large when the vehicle is passed by another vehicle in a tunnel, the collector head 22 is similarly directed downward. When the vehicle enters into a tunnel at a high speed, the collector head 22 is also directed downward. In FIG. 32, the controller for raising and lowering 364 operates the cylinder 7 using the running position information from the controller on the vehicle or the command from the central operation room.

Furthermore, a baffle plate may be placed at the back of the cable head 50 to straighten the air flow downstream of the cable head 50. The baffle plate is preferably made of an insulating material and attached to the mounting base 55 for the cable head 50.

Figure 39:
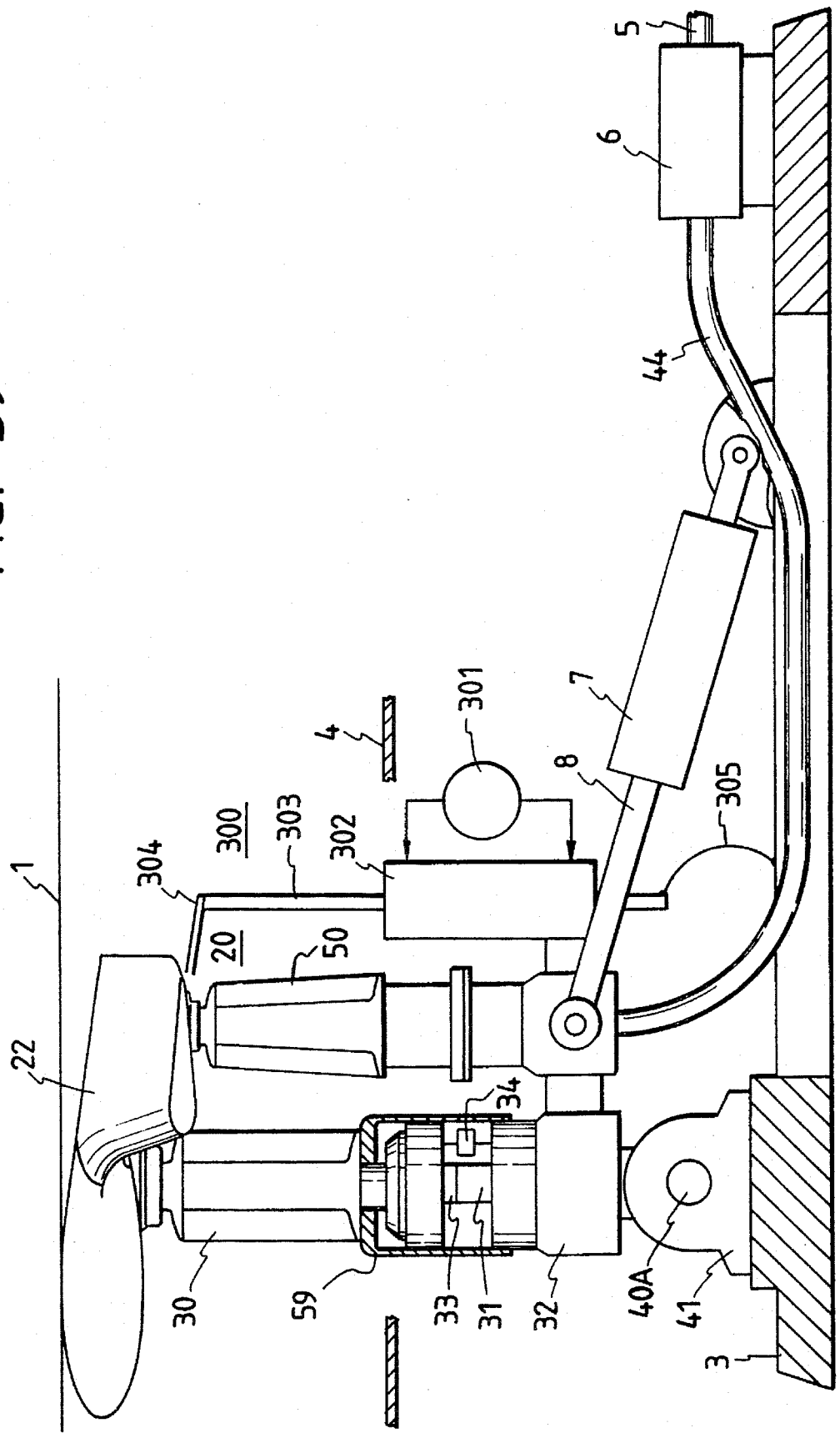
FIG. 39 is a view showing current collecting equipment with an emergency ground switch.

It is desirable to provide an emergency ground switch EGS in the current collector 20. That is, as shown in FIG. 39, an emergency ground switch EGS 300 is installed parallel to the cable head 50 in the current collector 20. The emergency ground switch EGS has a copper rod 303 driven by a cylinder mechanism 302 operated by a compressed air source 301. The copper rod 303, which is normally in the containing dome, is projected from the containing dome in response to a driver's emergency operation to connect its upper end to the collector head 22 through a clip 304, as shown in the figure. The numeral 305 indicates a braided copper wire connected to the base plate 3. The emergency ground switch EGS has the function on to shunt the vicinity of the collector head 22 to the ground as fast as possible in an emergency. The emergency ground switch EGS cylinder mechanism 302, which is formed with the cylinder 32 as a unit, is rotated to be raised or lowered together with the supporting insulator 30 and the cable head 50 by the rotating system 40.

In accordance with the present invention, it is possible for the cable head 50 for current conduction to be installed with a mechanism allowing it to tilt to make the high voltage cable easily movable. When this is done, the cable head 50 for current conduction is not parallel to the support insulator 30, which decreases the standing wave produced between them and thus further decreases noise.

According to the embodiments of the present invention described above, a part of the structure having a current collecting function can be light in weight and small in size and can improve the control characteristic to follow the trolley wire 1, since the part of the structure having the current collecting function, which comprises the current collecting member and the driving system, is installed separately from the part of the structure having the power current conducting function, which can, further, maintain the power current collecting function sufficiently.

Furthermore, the generation of noise during vehicle running can be suppressed, since there is provided a containing system on the roof of the vehicle inside of which the driving system is always contained and in which the part of the structure having the current collecting function together with the part of the structure having the power current conducting function is contained when it is not needed.

Figure 40:
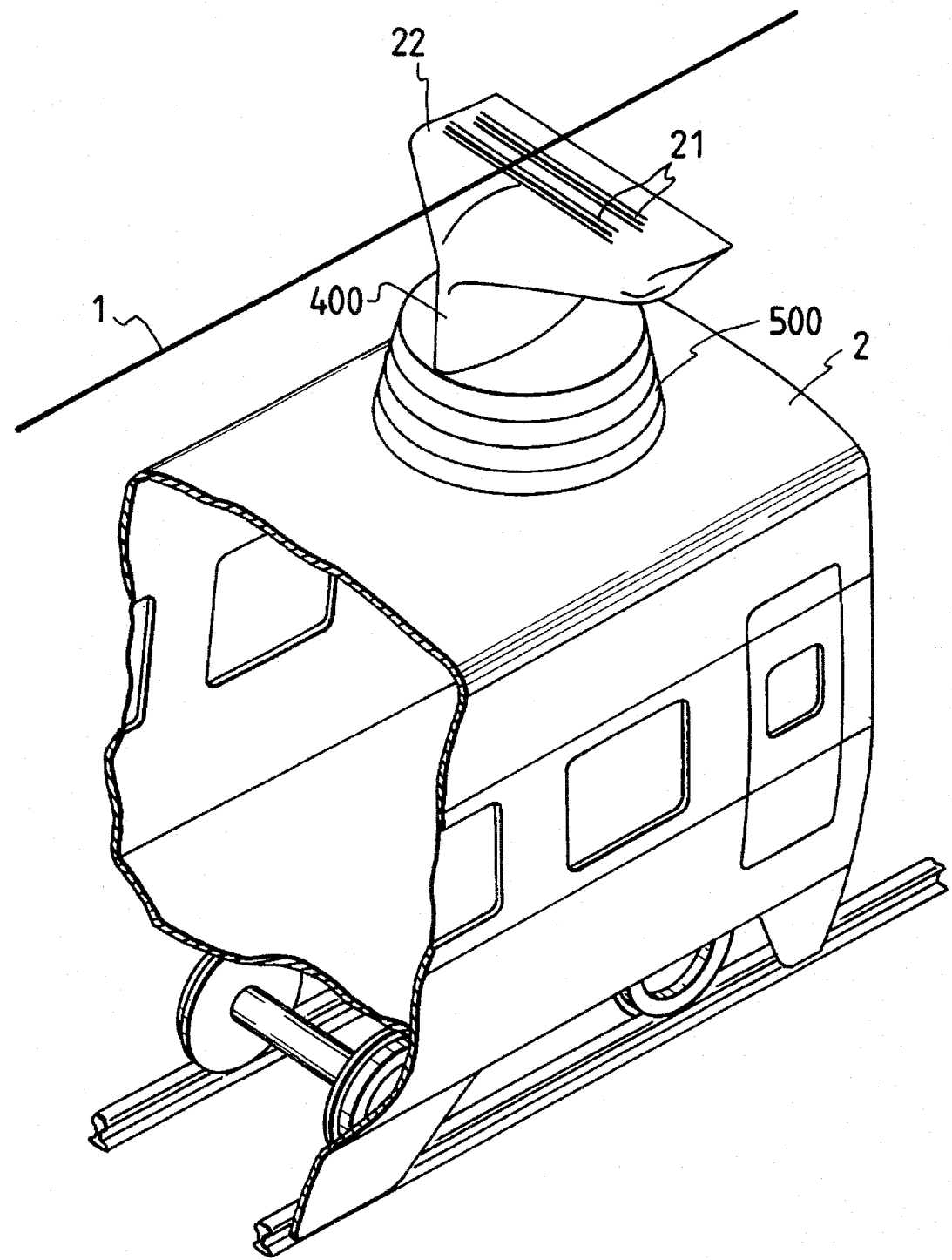
FIG. 40 is a perspective view showing a current collector in accordance with the present invention.

Referring to FIG. 40 through FIG. 51, various features of the current collector 20 and its performance will be discussed. In FIG. 40, the current collector 20 comprises a current collecting contact strip 21 to collect current from a trolley wire 1, a collector head 22 having a front portion in the running direction which is swept back in its longitudinal direction to mount the current collecting contact strips 21, a supporting column 400 having a stream-line shape to support the collector head 22, an insulator 500 to insulate electrically the vehicle body 2 from the current collector 20 and driving means (not shown) for driving them vertically.

Since the contact strips 21 and the collector head 22 of conventional current collectors 20 are formed of two dimensional shaped members, such as circular bars, a two dimensional vortex typical of a Karman vortex is easily generated, and so a large aero-hydraulic noise and a large air resistance is also generated, which has been a problem for high speed running. Since the stream-line shaped current collector proposed to dissolve this problem suppresses generation of a Karman vortex as compared to the non-stream-line shaped current collector, the noise can be lowered. However, since the current collector 20 has, even in this case, long members in the direction perpendicular to the running direction, the flow is apt to become two-dimensional. Therefore, even when the collector head is formed in a stream-line shape, the degree of generating aerodynamic noise has been large.

Although the noise for the stream-line shaped current collector 20 is lower the that for the non-stream-line shaped current collector 20, a further low noise current collector 20 has been desired for low noise high speed running.

Figure 41:
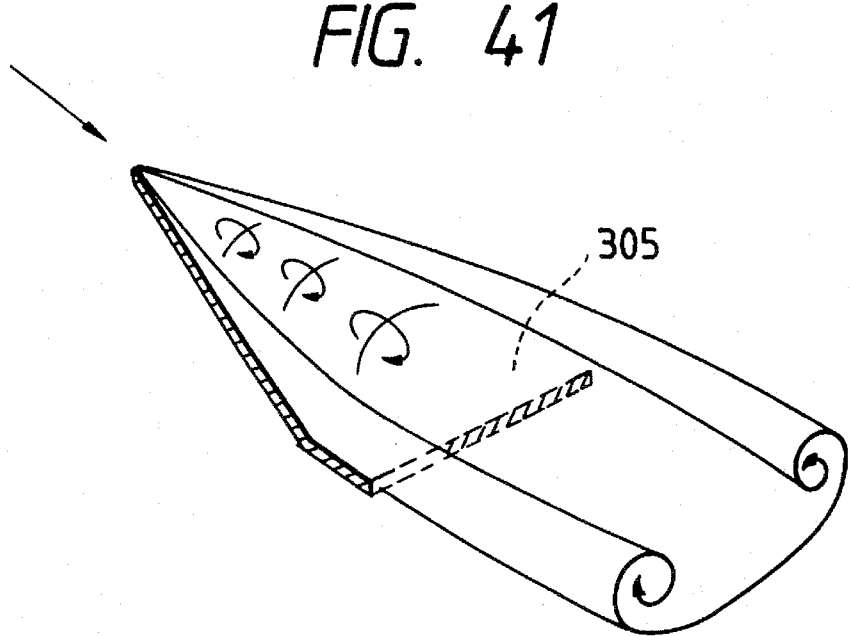
FIG. 41 is an illustrative view of the air flow around a current collector in accordance with the present invention.
Figure 42:
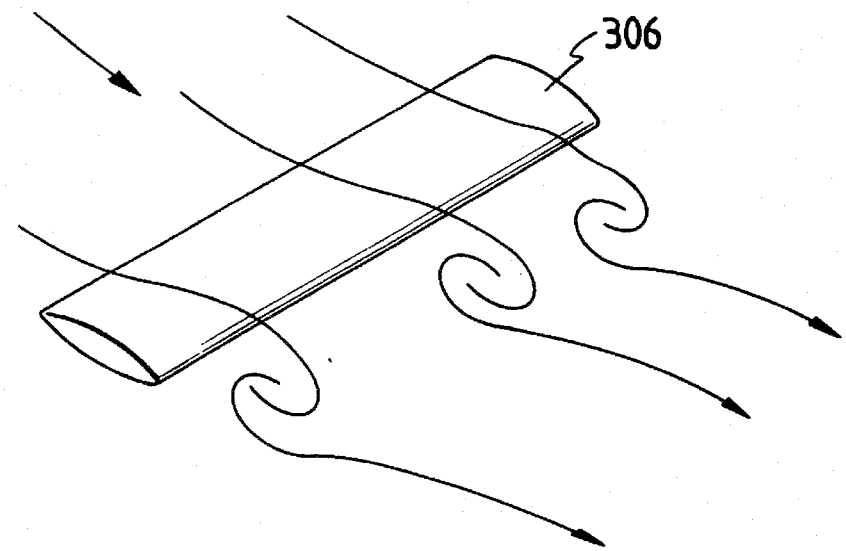
FIG. 42 is an illustrative view of air flow around a conventional stream-lined current collector.

Since the current collector 20 according to the present invention provides a collector head 22 having a front portion in the running direction which is swept back in its longitudinal direction, longitudinal vortexes are generated around the collector head 22. The longitudinal vortexes suppress generation of a vortex having a two dimensional structure typical of a Karman vortex. FIG. 41 and FIG. 42 illustratively show the flow around collector heads, a collector head 305 (FIG. 41) according to the present invention and a wing-shaped collector head 306 (FIG. 42) used in a general stream-line shaped current collector 20. In the current collector 305 according to the present invention, the longitudinal vortexes suppress the vortexes with synchronized phase which are apt to generate noise, and consequently suppress generation of noise.

Figure 43A:
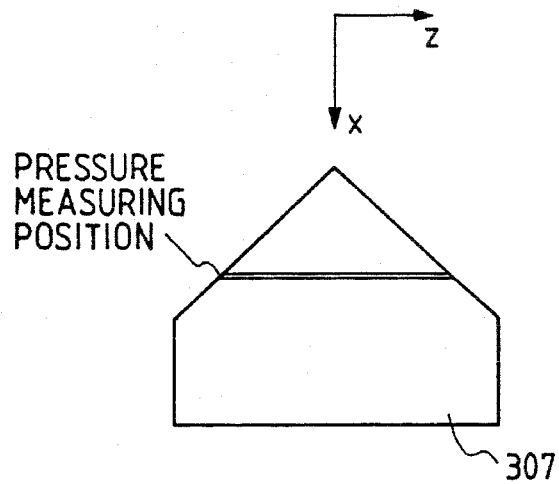
FIG. 43(a) is a diagram of a collector head and FIG. 43(b) is a graph showing the pressure distribution in the lateral direction on the surface of the collector head of current collecting equipment in accordance with the present invention.
Figure 43B:
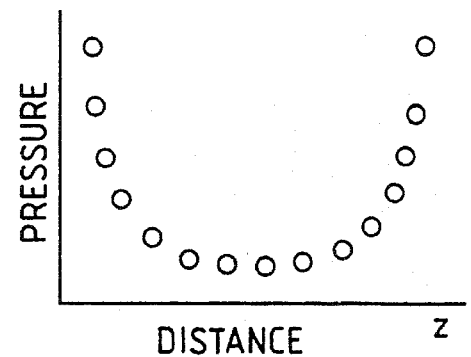
Figure 44A:
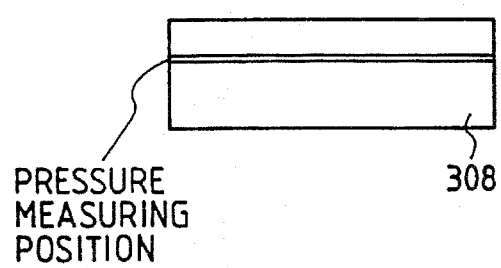
FIG. 44(a) is a diagram of a collector head and FIG. 44(b) is a graph showing the pressure distribution in the lateral direction on the surface of the collector head of a conventional stream-lined current collecting equipment.
Figure 44B:
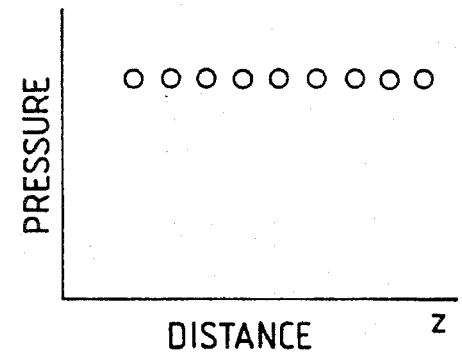

FIG. 43(a) through FIG. 44(b) illustratively show pressure distribution on the surfaces of collector heads. In the conventional two dimensional wing 308, as shown in FIG. 44(a), since the wake is two dimensional, the pressure on the surface is also uniform and two dimensional along the longitudinal direction of the wing 308, as seen in FIG. 44(b). On the other hand, in the collector head 307 having a sweep-back front end surface according to the present invention, as shown in FIG. 43(a), since the pressure distribution is not uniform along the lateral direction of the collector head 22, as seen in FIG. 43(b), the noise is hardly generated.

Figure 45:
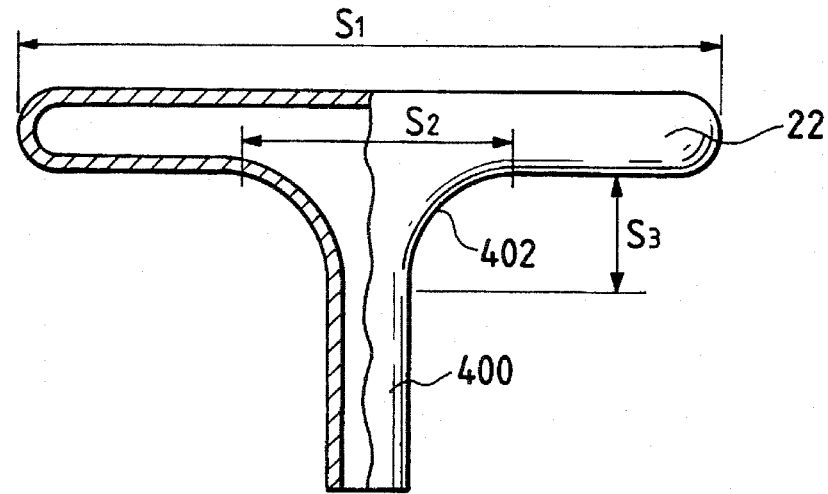
FIG. 45 is a view showing the shape of a low aerodynamic noise collector head and supporting column in accordance with the present invention.

In order to lower the aerodynamic noise generated by the flow around the connecting portion between the collector head 22 and the supporting column 400, the connecting portion between the collector head 22 and the supporting column 400 is formed with a curved surface, as shown in FIG. 45. Stated in another way, the connecting portion is formed with a polygon surface such that the connecting portion has no acute angle. When the connecting portion between the collector head 22 and the supporting column 400 has an acute angle or a right angle, there appears a secondary flow there to generate aerodynamic noise. Since an abrupt change of flow in the vicinity of a wall surface is apt to generate noise, employing the connecting portion according to the present invention decreases noise. Especially, when the length $S_2$ of the portion where the smooth surface contacts the collector head 22 is nearly one third of the length $S_1$ of the collector head 22 in its longitudinal direction and the length $S_3$ between the bottom surface of the collector head 22 and the portion where the smooth surface contacts the supporting column 400 is nearly one sixth of the length $S_1$ of the collector head 22 in its longitudinal direction, the effect to lower the noise is large.

Figure 46:
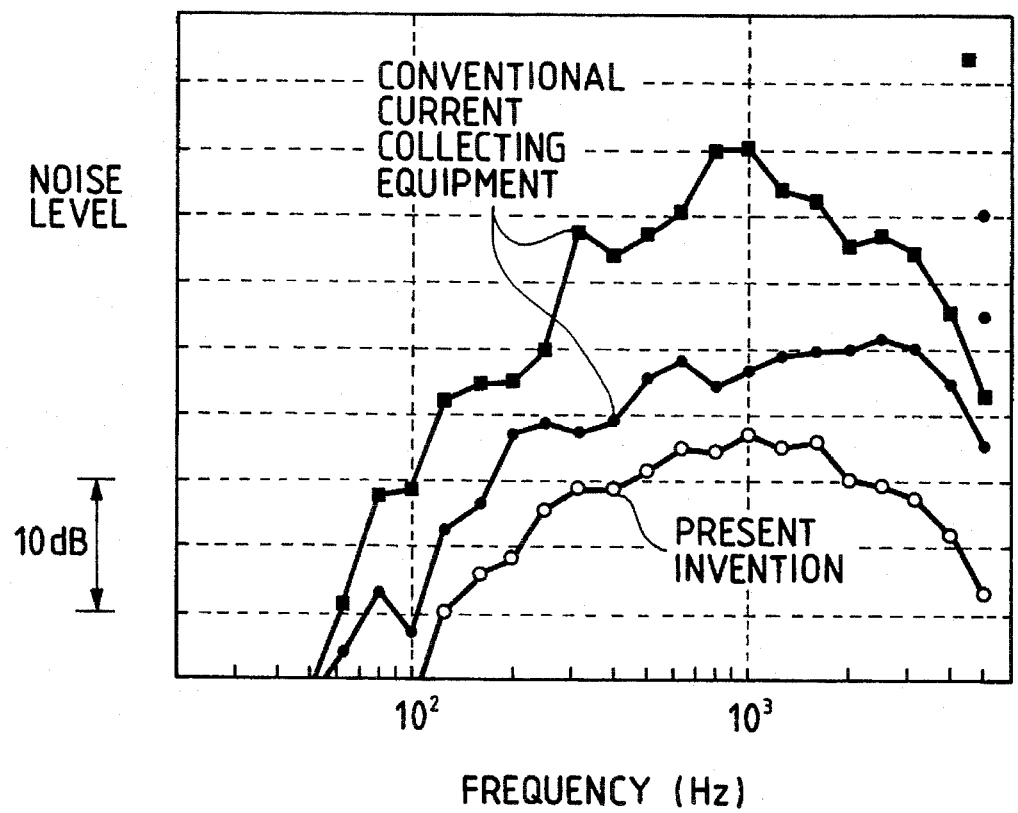
FIG. 46 is a graph showing the results of a wind tunnel test showing the noise decreasing effect of current collecting equipment in accordance with the present invention.

FIG. 46 shows the result on noise obtained from a wind tunnel test using a model of a current collector 20 according to the present invention, as well as showing the result of a conventional current collector 20 for comparison. The current collector 20 according to the present invention (circles) lowers the noise by approximately 20 dB compared to the conventional current collector, and by more than 5 dB compared to the streamline shaped current collector.

It is also preferable that the collector head 22 has a shape where the cross section of the collector head is wing-shaped and the front faces on both sides of the collector head are swept back. For the collector head 22 having such a shape as described above, since the edges are swept back to the collector head, the contact strip 21 on the edge line will not generate vortexes which are uniform and have synchronized phase, and consequently the noise is lowered.

Figure 47:
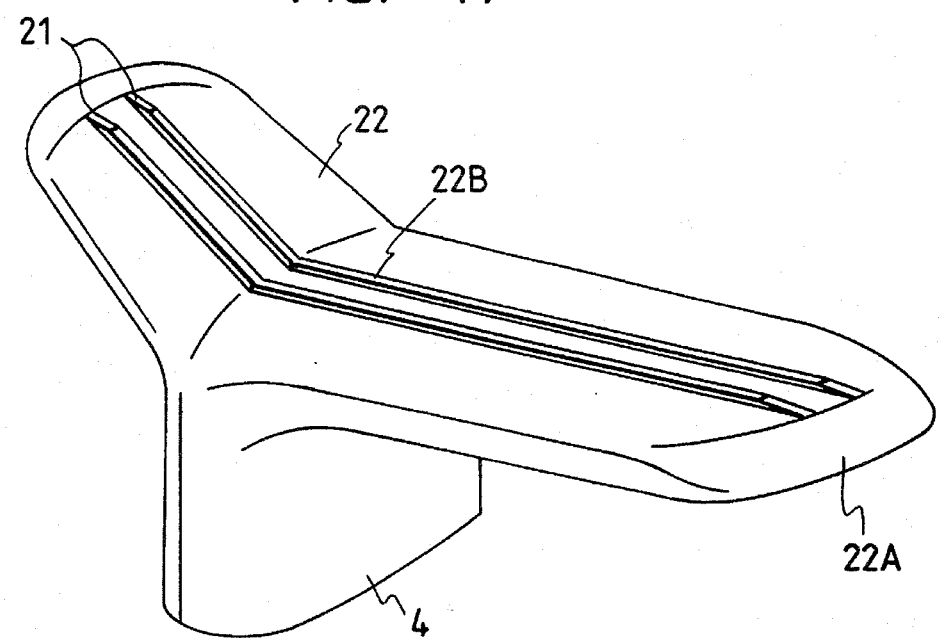
FIG. 47 is a perspective view showing another current collector in accordance with the present invention.

In FIG. 47, collector head 22 has the shape of a rhombus (in plan view) formed by combining two collector heads having front faces on both outer sides 22A swept back against the central portion 22B fore and aft. That is, the collector head is symmetrical in the fore and aft directions and has a shape where the front edges are swept back in the longitudinal direction from the center of the collector head, which realizes a low noise current collector 20 generating a longitudinal vortex which is symmetrical fore and aft.

The both side ends of the collector head 22 are formed in convex curved surfaces on the upper surface side contacting the trolley wire 1 so as to minimize generation of wing top vortexes and so as to guide crossover.

There is a further aspect of the present invention in which the effective length of the contact strips 21 are changed depending on low or high speed running and corresponding to the running direction. During a low speed running, the effective length of the contact strip 21 is long to cope with a trolley wire change and the like. On the other hand, during high speed running, the shape of the collector head 22 changes into a shape suitable for decreasing noise.

There is another aspect of the present invention wherein a turntable is installed to mount a current collector 22 and rotate the current collector 22 corresponding to the running direction of the vehicle. By employing this technology, the number of the current collectors 20 to be mounted on the train can be decreased.

Figure 48:
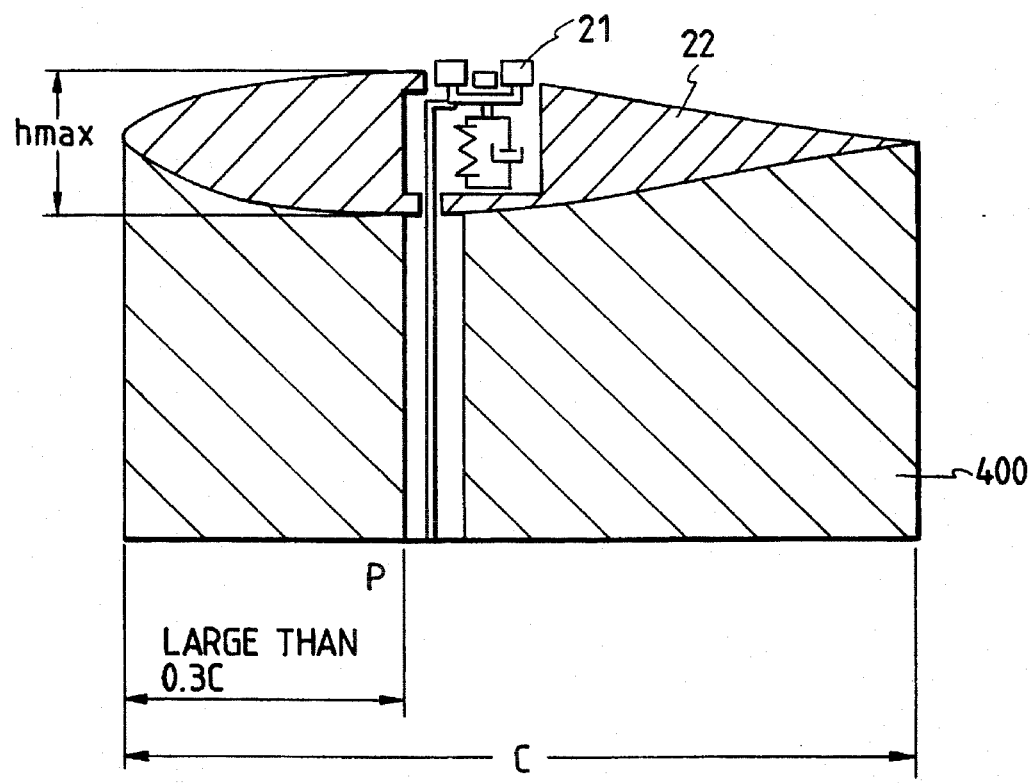
FIG. 48 is a cross-sectional view showing another current collector in accordance with the present invention.

FIG. 48 shows another form of the current collector 20 in which the collector head 22 has its maximum vertical thickness ($h_{max}$) position P of the wing shaped cross section located more than 30 percent of the chord length (C) from the front edge of the wing-shape, and the upper surface of the collector head 22 in the vicinity of the rear edge is a concave curved surface. In the case where the collector head 22 has such a shape as described above, it has been confirmed that the pressure drop from the maximum pressure point to the rear end is gentle and the aerodynamic noise is decreased. Therefore, the collector head 22 having this cross sectional shape according to the present invention is effective to decrease noise. Further, the collector head having a symmetrical shape to the horizontal line has had a high effect.

Figure 49:
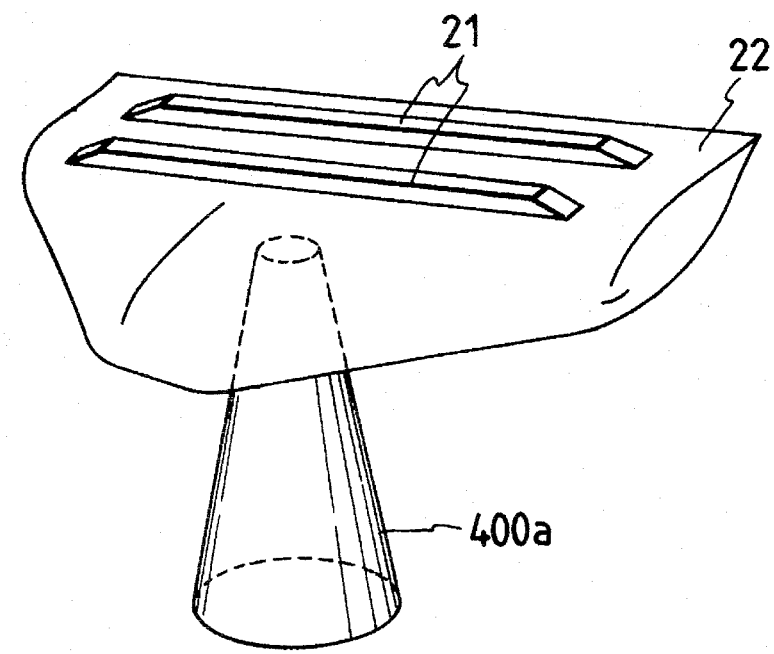
FIG. 49 is a perspective view showing another current collector in accordance with the present invention.

FIG. 49 shows a further form of the current collector with a support column 400 for the collector head 22 having a shape of a circular cone or elliptic cone 400a, which hardly will cause aerodynamic noise. Therewith, the flow around the supporting column varies in the vertical direction to make the flow three dimensional and to suppress the generation of noise.

Figure 50:
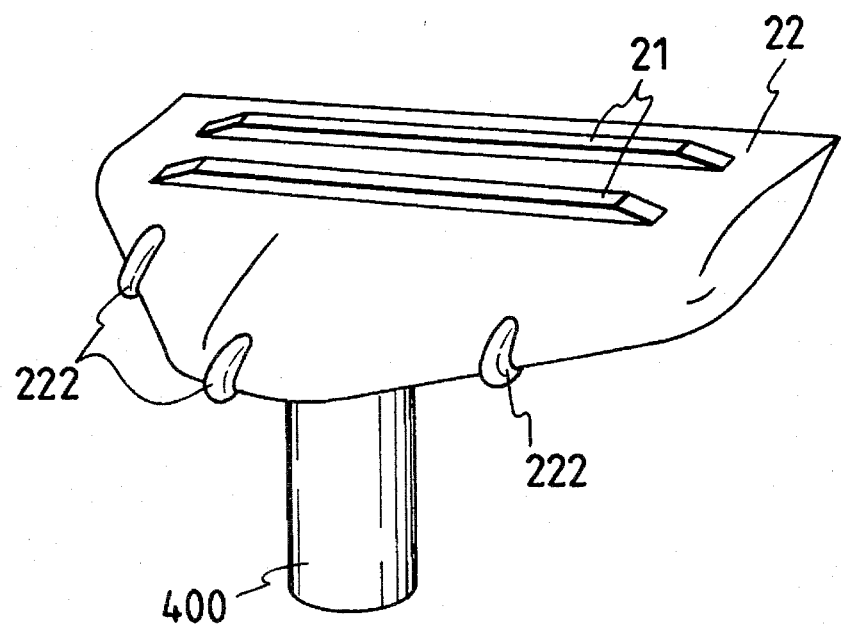
FIG. 50 is a view showing another current collector in accordance with the present invention.

FIG. 50 shows another form of the current collector of the present invention. When the contact strip 21 is of a two-dimensional shape, a large aerodynamic noise is generated. In this case, at least one or more projections 222 having a long shape in the running direction of the vehicle are provided at the positions narrower than the contact strip 21 in the vicinity of the front edge forward of the contact strip 21 on the collector head 22, and longitudinal vortexes are generated with these projections to suppress the Karman vortex-like aerodynamic noise caused by the contact strip 21. Especially, when more than three of the projections 222 are attached to the width of the contact strip 21, the effect to decrease noise is large.

Figure 51:
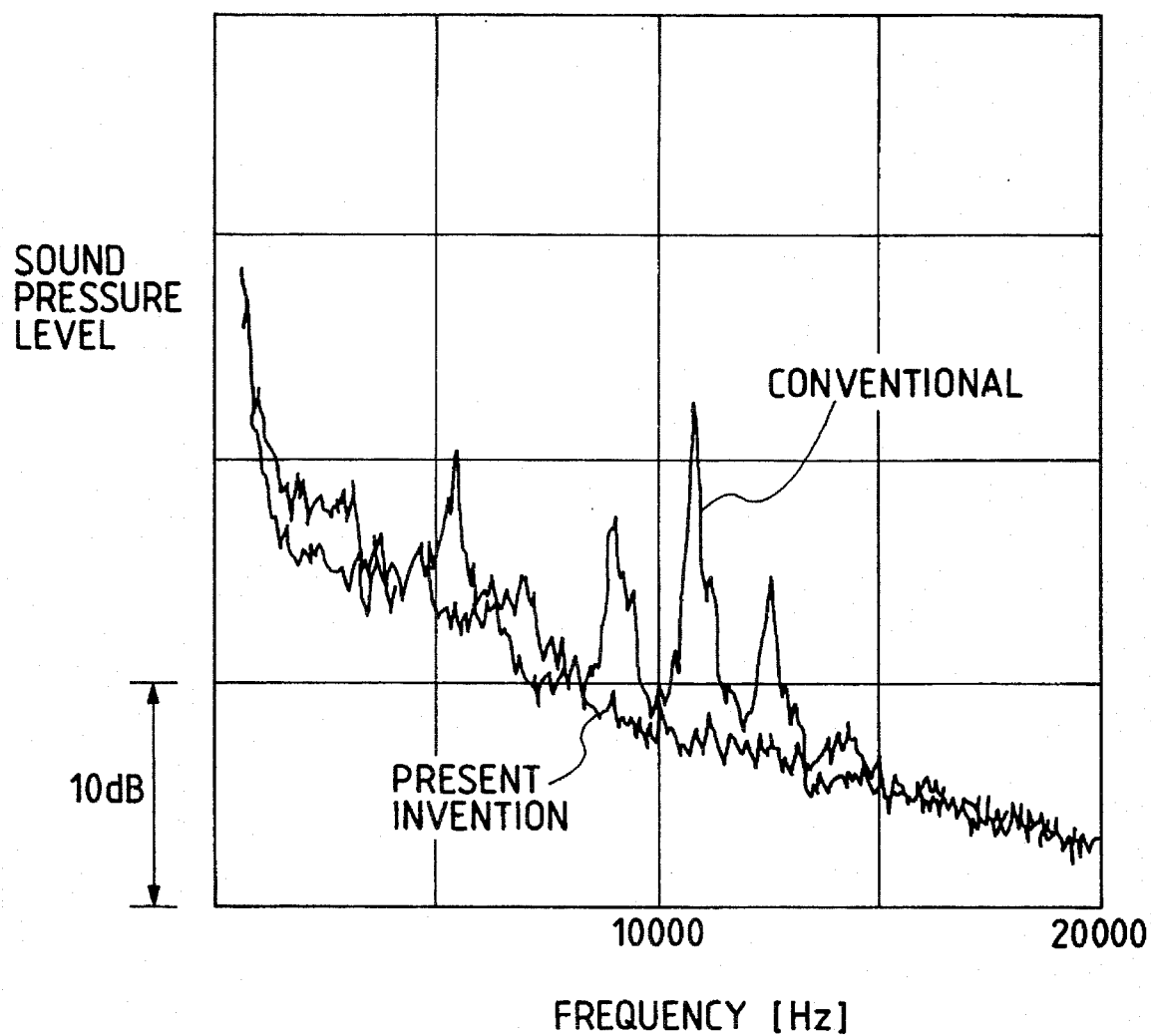
FIG. 51 is a graph showing the results of a wind tunnel test showing the effect of the present invention

FIG. 51 shows a result of a wind tunnel test for studying the noise decreasing effect of the present invention. The projections 222 for generating a longitudinal vortex according to the present invention is effective for decreasing noise.

According to the present invention, it is possible to decrease aerodynamic noise in a current collector for a high speed railway vehicle by using a collector head having a swept-back shape in its longitudinal direction so as to actively generate longitudinal vortexes on the collector head to suppress generation or the two dimensional vortex having a synchronized phase, that is to say, a vortex which is apt to generate aerodynamic noise, such as generated in a conventional current collector. Further, it is possible to decrease the aerodynamic noise produced from the connecting portion between a collector head and a supporting column by not only forming the collector head and the supporting column in stream-line shapes, but also smoothly connecting the collector head and the supporting column so as to suppress generation of a secondary flow at the connecting portion of the collector head and the column so as not to interfere with the longitudinal vortexes generated by the collector head.

According to another feature of the present invention, it is possible to decrease the aerodynamic noise caused by a two dimensional flow produced by the current collector by generating a three dimensional flow using a duct to generate a swirl flow.

According to a further feature of the present invention, parts of the collector head are movable so as to provide a function to guide the crossover of the trolley wire during low speed running and to provide a shape for low aerodynamic noise by flatting the collector head to lower noise during high speed running. With the structure, it is possible to obtain a shape which is low in noise generation during high speed running with no problem in changing the trolley wire during low speed running.

I claim:

1. A current collector comprising: a current collecting member, a driving system to move said current collecting member relative to a current supplying body, and a conductive element coupled to said current collecting member to conduct electric power collected by said current collecting member from said current supplying body to a load, wherein said current collecting member is coupled to said driving system through a first insulating element, and further comprising a sensor for controlling said driving system positioned between said driving system and said first insulating element.

2. A current collector according to claim 1, wherein said conductive element is juxtaposed in position with said driving system.

3. A current collector according to claim 1, wherein said conductive element is installed inside said first insulating element, one end of said conductive element being connected to said current collecting member, the other end of said conductive element being connected to a flexible conductive cable.

4. A current collector according to claim 1, wherein said sensor is a sensor for detecting force.

5. A current collector according to claim 1, wherein said first insulating element is formed to support the total weight of said current collecting member, said conductive element being an insulating coated conductive element the surface of which is covered with insulating material, said insulating coated conductive element being coupled to said current collecting member in parallel with said driving system.

6. A current collector according to claim 1, wherein said conductive element is juxtaposed in position with said driving system, further comprising a support base mounting said driving system and said current collecting member, means for rotating said support base and for raising and lowering said current collecting member, said first insulating element and said conductive element as a unit.

7. A current collector according to claim 1, wherein said driving system comprises a link mechanism to drive said current collecting member, and an actuator to drive said link mechanism.

8. A current collector according to claim 1, wherein said current collector comprises a collector head supporting said current collecting member and a supporting column between said current collecting member and said driving system, a connecting portion between said collector head and said supporting column being formed of a curved surface.

9. A current collector according to claim 1, wherein said conductive element is covered with an insulator on its surface and is juxtaposed in position with said first insulating element.

10. A current collector according to claim 9, wherein said conductive element penetrates the inside of a second insulating element which is provided separately from said first insulating element, one end of said conductive element having a flexible conductor which is connected to said current collecting member, the other end of said conductive element being connected with a flexible cable.

11. A current collector according to claim 1, further comprising a containing dome to contain said driving system, said first insulating element and said conductive element.

12. A current collector according to claim 11, wherein said conductive element is juxtaposed with said insulating element and said driving system, said conductive element and said driving system being mounted on a common supporting member in said containing dome.

13. A current collector according to claim 1, wherein a collector head, which supports said current collecting member, is installed between said current collecting member and said first insulating element, and has a shape where the top front surface of said collector head in the running direction is swept back in its lateral direction.

14. A current collector according to claim 13, wherein the vertical cross-sectional shape of said collector head is wing-shaped.

15. A current collector according to claim 14, further comprising at least one or more longitudinal vortex generating means for generating longitudinal vortexes on said top front surface of said collector head.

16. A current collector comprising: a current collecting member, a driving system to move said current collecting member relative to a current supplying body, and a conductive element coupled to said current collecting member to conduct electric power collected by said current collecting member from said current supplying body to a load, wherein said current collecting member is coupled to said driving system through a first insulating element, and further comprising detecting means for detecting a fluctuating force, including a disturbance, acting on said current collecting member, said detecting means being mounted between said current collecting member and said driving system, estimating means for calculating a contacting force estimated signal, which estimates a state through the signal from said detecting means, control means for producing a force difference signal obtained by subtracting a disturbance suppressing force estimated signal and said contact force estimated signal, output from said estimating means, from a contact force target value signal, and for controlling said driving system on the basis of said force difference signal.

17. A current collector comprising: a current collecting member, a driving system to move said current collecting member relative to a current supplying body, and a conductive element coupled to said current collecting member to conduct electric power collected by said current collecting member from said current supplying body to a load, wherein said current collecting member is coupled to said driving system through a first insulating element, and further comprising a containing dome to contain said driving system, said first insulating element and said conductive element, wherein said containing dome comprises a smooth streamline-shaped outer surface, an opening sufficiently large to allow said first insulating element to pass therethrough, and a shutter to cover said opening.

18. A current collector according to claim 17, wherein said conductive element is juxtaposed with said insulating element and said driving system, said conductive element and said driving system being mounted on a common supporting member in said containing dome.

19. A railway vehicle comprising a current collecting member, a driving system to move said current collecting member, and a conductive element to conduct electric power collected by said current collecting member to a load, wherein said current collecting member and said driving system are connected through an insulating element, said conductive element being juxtaposed in position with said driving system, and further comprising a first insulating column forming said insulating element to connect said current controlling member with said driving system, and a second insulating column to support said conductive member.

20. A railway vehicle according to claim 19, further comprising a support base to mount said driving system and said current controlling member, means for rotating said support base and for raising and lowering said current collecting member, said driving system and said conductive element as a unit, a containing part to contain said current collecting member in a flat condition installed on the roof of the vehicle.

21. A railway vehicle according to claim 19, wherein said second insulating column is positioned below said current collecting member and in back of said first insulating column in the running direction of the vehicle, the outer diameter of said second insulating column being smaller than the outer diameter of said first insulating column.

22. A railway vehicle according to claim 19, further comprising detecting means for detecting a fluctuating force, including a disturbance, acting on said current collecting member installed between said current collecting member and said driving system, estimating means for calculating a contacting force estimated signal which estimates a state in response to a signal from said detecting means, control means for calculating a force difference signal obtained by subtracting a disturbance suppressing force estimated signal and said contact force estimated signal, output from said estimating means, from a contact force target value signal, and for controlling a driving signal on the basis of said force difference signal.

23. A railway vehicle comprising a current collecting member, a driving system to move said current collecting member, and a conductive element to conduct electric power collected by said current collecting member to a load, wherein said current collecting member and said driving system are connected through an insulating element, said conductive element being juxtaposed in position with said driving system, and further comprising an electric conducting system disposed between said current collecting member and the vehicle main body, said electric conducting system comprising a vacuum circuit breaker and circuit breaker control means for opening and closing said vacuum circuit breaker in accordance with the driving condition of said driving system.

24. A current collector for a railway vehicle comprising:
a driving system to move a collector head carrying a current collecting member;
a conductive element to conduct electric power collected by said current collecting member to a load, wherein said collector head is connected to said driving system through an insulating element; and
a containing dome to house said driving system, said insulating element and said collector head, said containing dome having a smooth stream-line-shaped outer surface, and an opening sufficiently large to allow said insulating element, said collector head and said conductive element to pass therethrough.

25. A current collector for railway vehicle according to claim 24, wherein said collector head, which supports said current collecting member, is installed between said current collecting member and said insulating element and has a vertical cross-sectional shape which is wing-shaped, the top front surface of said collector head in the running direction being swept back in it lateral direction, said collector head being supported so as to be pivotable backward using a raising and lowering system to house the collector head into said containing dome.

26. A current collector for railway vehicle according to claim 24, wherein said collector head has a vertical cross-sectional shape which is wing-shaped and the top front surface of said collector head in the running direction is swept back in its lateral direction, said collector head being supported so as to be pivotable in a forward direction using a raising and lowering system to house the collector head into said containing dome.

27. A method of collecting current for a railway vehicle having a current collector, which includes a collector head mounting a current collecting member thereon, a driving system to move said collector head relative to a current supplying body to collect current, an electric conducting system installed between said collector head and the vehicle body, said collector head being connected to said driving system through an insulating element, the method comprising the steps of:

positioning said collector head so that said current collecting member is disposed in the vicinity of said current supplying body; and operating said driving system to keep a contacting relationship between said current collecting member and said current supplying body to collect current;

wherein said positioning of said collector head includes raising said insulating element from a lowered position using a raising and lowering system under a condition where said electric conducting system is opened with a vacuum circuit breaker, and closing said vacuum circuit breaker after said current collecting member contacts said current supplying body.

28. A method of collecting current for a railway vehicle having a current collector, which includes a collector head mounting a current collecting member thereon, a driving system to move said collector head relative to a current supplying body to collect current, an electric conducting system installed between said collector head and the vehicle body, said collector head being connected to said driving system through an insulating element, the method comprising the steps of:

positioning said collector head so that said current collecting member is disposed in the vicinity of said current supplying body; and operating said driving system to keep a contacting relationship between said current collecting member and said current supplying body to collect current;

further including opening said electric conducting system with a vacuum circuit breaker in advance of disconnecting said current collecting member from said current supplying body using said driving system.

29. A method of collecting current for a railway vehicle having a current collector, which includes a collector head mounting a current collecting member thereon, a driving system to move said collector head relative to a current supplying body to collect current, an electric conducting system installed between said collector head and the vehicle body, said collector head being connected to said driving system through an insulating element, the method comprising the steps of:

positioning said collector head so that said current collecting member is disposed in the vicinity of said current supplying body; and operating said driving system to keep a contacting relationship between said current collecting member and said current supplying body to collect current;

wherein said step of operating said driving system includes detecting a fluctuating force, including a disturbance, acting on said current collecting member using detecting means installed between said current collecting member and said driving system, producing a contacting force estimated signal which estimates a state using a signal from said detecting means, producing a force difference signal by subtracting a disturbance suppressing force estimated signal and said contact force estimated signal from a contact force target value signal, and controlling said driving system on the basis of said force difference signal.

30. A method of collecting current for a railway vehicle having a current collector, which includes a collector head mounting a current collecting member thereon, a driving system to move said collector head relative to a current supplying body to collect current, an electric conducting system installed between said collector head and the vehicle body, said collector head being connected to said driving system through an insulating element, the method comprising the steps of:

positioning said collector head so that said current collecting member is disposed in the vicinity of said current supplying body; and operating said driving system to keep a contacting relationship between said current collecting member and said current supplying body to collect current;

further including the steps of opening said electric conducting system under a condition where said collector head is in contact with said current supplying body; then moving said insulating element away from said supplying body using said driving system;

opening a shutter covering an opening of a containing dome;

lowering said insulating element and said collector head into said containing dome through the opening of said containing dome; and closing said shutter.

31. A method of collecting current for a railway vehicle comprising a current collecting member, a driving system to move said current collecting member, a conductive element to conduct electric power collected by said current collecting member to a load, and a containing dome having a smooth stream-line-shaped outer surface to contain said driving system, an insulating element and said conductive element, the method comprising the steps of:

projecting said insulating element and said conductive element from said containing dome for collecting current using said driving system so that said conductive element is in contact with a current supplying body, and retracting said insulating element and said conductive element into said containing dome using said driving system during a time when current is not to be collected.

* * * * *